US012792292B2

(12) United States Patent
Gunasekaran

(10) Patent No.: US 12,792,292 B2
(45) Date of Patent: Nov. 10, 2026

(54) METHOD AND SYSTEM FOR BLENDING AUDIO SIGNALS

(71) Applicant: NXP B.V., Eindhoven (NL)

(72) Inventor: Shanmugam Gunasekaran, Bangalore (IN)

(73) Assignee: NXP B.V., Eindhoven (NL)

(*) Notice: Subject to any disclaimer, the term of this patent is extended or adjusted under 35 U.S.C. 154(b) by 219 days.

(21) Appl. No.: 18/746,093

(22) Filed: Jun. 18, 2024

(65) Prior Publication Data

US 2025/0321704 A1 Oct. 16, 2025

(30) Foreign Application Priority Data

Apr. 16, 2024 (IN) ............................ 202441030393

(51) Int. Cl.
*G06F 3/16* (2006.01)
*G06N 20/00* (2019.01)

(52) U.S. Cl.
CPC ............... *G06F 3/16* (2013.01); *G06N 20/00* (2019.01)

(58) Field of Classification Search
CPC . G06F 3/16; G06N 20/00; G06N 3/02; G06N 3/08; H04H 20/26; H04H 20/22; H04H 20/12; H04H 60/12; H04H 60/29; H04H 60/58; H04H 20/30; H04H 40/18; H04H 60/11; H04R 3/00; G10L 25/30; G10L 25/60; G10L 19/022; H04L 65/61; H04L 65/611; H04L 65/612; H04L 65/613; H04L 1/004; H04L 1/0045; H04B 1/16; H04B 1/1027
USPC .......................................................... 700/94
See application file for complete search history.

(56) References Cited

U.S. PATENT DOCUMENTS

| | | | | |
|---|---|---|---|---|
| 9,202,464 | B1 * | 12/2015 | Senior | G06N 3/0499 |
| 9,596,044 | B2 | 3/2017 | Nekhamkin et al. | |
| 9,837,061 | B2 | 12/2017 | Gautama | |
| 10,255,034 | B2 | 4/2019 | Gautama et al. | |
| 11,418,879 | B2 | 8/2022 | Luyten et al. | |
| 2020/0412864 | A1 * | 12/2020 | Al Majid | G06F 3/0488 |
| 2021/0082449 | A1 * | 3/2021 | Appleton | G10L 21/0224 |
| 2023/0206936 | A1 * | 6/2023 | Laroche | G10L 21/0208 704/226 |

(Continued)

FOREIGN PATENT DOCUMENTS

| | | | | | |
|---|---|---|---|---|---|
| CN | 101233560 | B | * | 8/2011 | |
| CN | 117409819 | A | * | 1/2024 | G10L 25/66 |
| CN | 117612566 | A | * | 2/2024 | G10L 25/60 |

*Primary Examiner* — Duc Nguyen
*Assistant Examiner* — Chimezie Ezeriwe Bekee

(57) ABSTRACT

A digital signal processing (DSP) circuit of a system for blending audio signals executes a trained machine learning model to extract audio parameters associated with audio blocks of two received audio signals and generates audio quality scores. Each audio quality score indicates an audio quality of the audio block. Upon analyzing the corresponding audio quality scores of the two audio signals, the DSP circuit outputs an audio block of one of the audio signals based on a previous blended block or blends one of the audio blocks of the two audio signals to output a blended block that includes a composition of the corresponding audio blocks of the two audio signals. The system thus outputs an audio output signal that includes such audio blocks that are associated with at least one of the two audio signals.

19 Claims, 13 Drawing Sheets

(56) References Cited

U.S. PATENT DOCUMENTS

| | | | |
|---|---|---|---|
| 2024/0304186 | A1* | 9/2024 | Shin ........................ G10L 15/16 |
| 2025/0140281 | A1 | 5/2025 | Biswas et al. |

* cited by examiner

600

METHOD AND SYSTEM FOR BLENDING AUDIO SIGNALS

CROSS-REFERENCE TO RELATED APPLICATION

This application claims priority under 35 U.S.C. § 119 to Indian patent application no. 202441030393, filed 16 Apr. 2024, the contents of which are incorporated by reference herein.

TECHNICAL FIELD

The present disclosure relates generally to frequency modulation (FM) communication and, more particularly, to a system and a method for blending audio signals.

BACKGROUND

Radio stations typically broadcast a single program simultaneously at alternative frequency modulation (FM) frequencies, e.g., a primary FM signal and an alternative FM signal. One of the primary FM signal or the alternative FM signal is selected as an output signal that is to be played as an audio by a dual FM radio receiver of a user based on a power strength of each of the primary FM signal and the alternative FM signal remaining above acceptable power levels. An audio quality of an FM signal typically deteriorates prior to the power strength of the FM signal falling below an unacceptable level. In a scenario, the power strength of the primary FM signal and the alternative FM signal are above acceptable power levels. However, the audio quality of the primary FM signal has deteriorated, whereas the audio quality of the alternative FM signal remains above an acceptable quality level. In such a scenario, when the primary FM signal is selected as the output signal as compared to the alternative FM signal, multiple interruptions may occur in the audio that is played due to the deteriorated audio quality of the primary FM signal. Thus, a listening experience of the user is affected.

DETAILED DESCRIPTION

Figure 1:
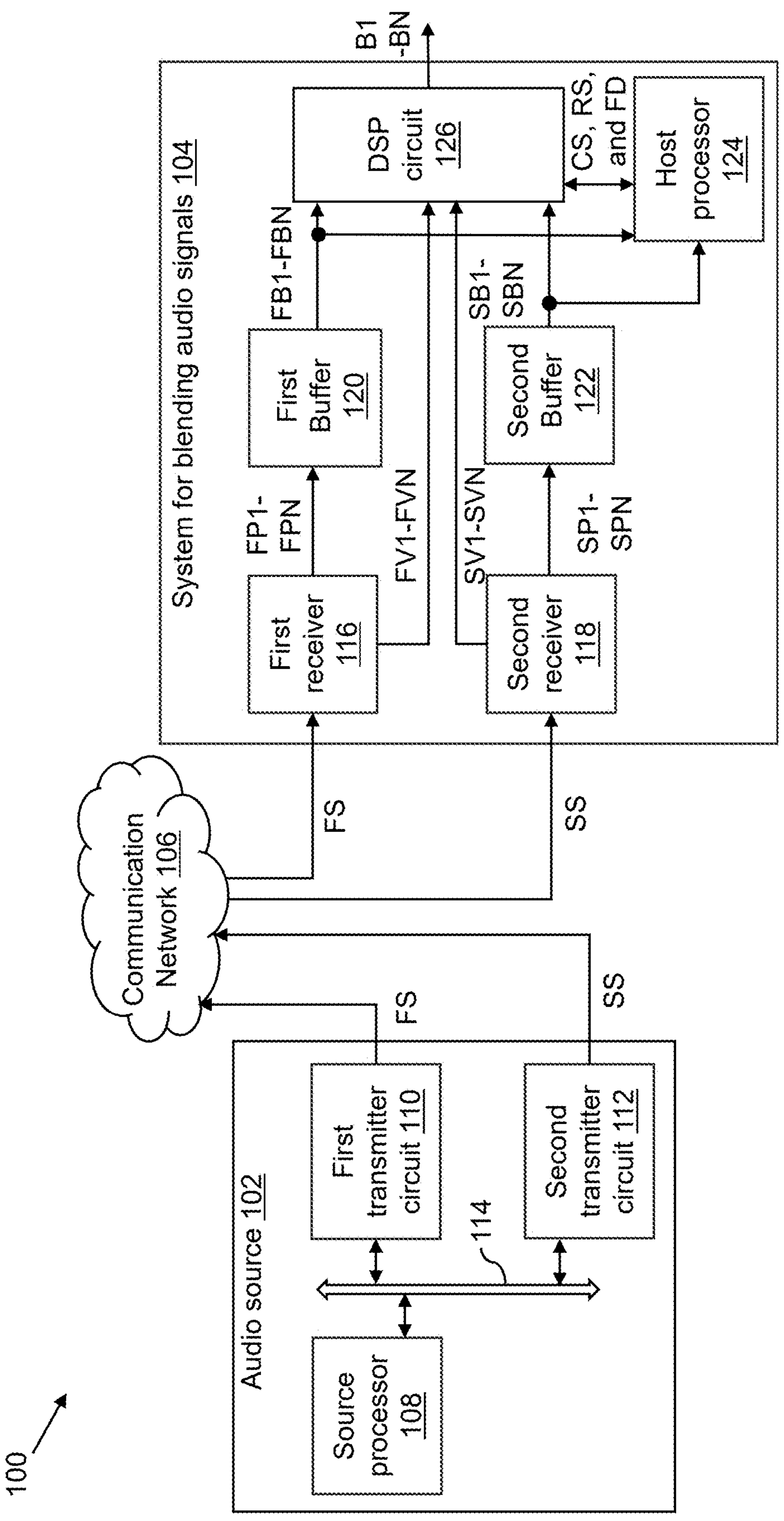
FIG. 1 illustrates a schematic diagram of a frequency modulation (FM) environment in accordance with an exemplary embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Overview

Typically, a dual frequency modulation (FM) radio receiver may receive both an FM signal and an alternative FM signal that are broadcasted from an audio source. Data associated with the alternative FM signal may be identical to data associated with the FM signal. Due to the gradual fading nature of the FM signal, the dual FM radio receiver may determine whether to switch from the FM signal to the alternative FM signal or vice versa based solely on the received signal strength, e.g., power levels of the FM signals. In a scenario where the FM signal may have a low power level and the alternative FM signal may have an acceptable power level, the dual FM radio receiver may switch from the FM signal to the alternative FM signal. However, an audio quality of the alternative FM signal may have deteriorated before the instance of switching from the FM signal to the alternative FM signal. Thus, the played audio is distorted due to interruptions, such as muting or pausing, thereby affecting a listening experience of the user.

Various embodiments of the present disclosure disclose a system for blending audio signals. The system may include a digital signal processing (DSP) circuit, a first receiver, a second receiver, a first buffer, a second buffer, and a host processor. The first receiver and the second receiver may receive a first audio signal and a second audio signal, respectively, from an audio source. The audio source may be a radio station broadcasting a program by transmitting the first audio signal and the second audio signal. The first receiver and the second receiver may convert the first analog signal and the second analog signal from an analog format to a digital format and may provide digitized versions of the first audio signal and the second audio signal to the first buffer and the second buffer, respectively. The first buffer and the second buffer may store the digitized version of the first audio signal and the second audio signal as first audio blocks and second audio blocks of the first and second audio signals, respectively. The DSP circuit may read the first audio blocks and the second audio blocks from the first buffer and the second buffer, respectively. The DSP circuit may extract first audio parameters associated with the first audio blocks and second audio parameters associated with the second audio blocks by executing a trained machine learning model. The trained machine learning model may be further executed to process the first audio parameters and the second audio parameters to generate first audio quality scores and second audio quality scores, respectively. Each audio quality score may indicate an audio quality of a corresponding audio block of the first audio blocks and the second audio blocks. The DSP circuit may analyze each of the first audio quality scores and the second audio quality scores. The DSP circuit may blend the first audio blocks and the second audio blocks upon analyzing the first audio quality scores and the second audio quality scores to output blended blocks. Each of the blended blocks is at least one of the first audio blocks and the second audio blocks. Additionally, the audio blocks may be tuned prior to blending the first audio blocks and the second audio blocks based on an expected delay between the first audio blocks and the second audio blocks.

In contrast to conventional solutions that solely rely on power levels of the analog FM signal, in the present disclosure, the DSP circuit may output the audio blocks based on an audio quality score that indicates the quality of an audio block. Thus, the signals are blended based on analysis of the first audio quality scores, the second audio quality scores, and a previous blended block. The analysis of the first audio quality scores and the second audio quality scores may enable the DSP circuit to provide an early prediction of blending since the audio quality of the audio blocks may deteriorate before the power level of the corresponding FM signal is detected to be below the threshold power level. The early prediction of blending may further enable the DSP circuit to play the audio comparatively smoother compared to the conventional solutions that solely rely on the power level of the analog FM signal. Thus, a listening experience of the user is enhanced.

FIG. 1 illustrates a schematic diagram of a frequency modulation (FM) environment 100 in accordance with an embodiment of the present disclosure. The FM environment 100 may include an audio source 102 and a system for blending audio signals 104, hereinafter referred to as the "system 104". The system 104 may be placed in a device (not shown). Examples of the device may include a dual FM radio receiver. A user (not shown) may operate or own the dual FM radio receiver.

The FM environment 100 may further include a communication network 106. The audio source 102 may communicate with the system 104 by way of the communication network 106. Examples of the communication network 106 may include the internet, a local area network (LAN), a wide area network (WAN), or the like.

Audio Source 102:

The audio source 102 may include suitable circuitry that may be configured to perform one or more operations. For example, the audio source 102 may broadcast or transmit a first audio signal FS and a second audio signal SS to the system 104. Each of the first audio signal FS and the second audio signal SS may be an analog FM radio signal that may be indicative of a radio program such as music, news, podcasts, or the like. Thus, data associated with the first audio signal FS and data associated with the second audio signal SS may be identical in nature. The audio source may transmit the first audio signal FS and the second audio signal SS to the system 104 by way of the communication network 106 in an analog format. The second audio signal SS may have an alternative frequency with respect to the first audio signal FS. The frequencies of the first audio signal FS and the second audio signal SS may be in a range of 76 megahertz (MHz) to 108 MHz, although the range may be lower, higher, or different. In an example, the frequency of the first audio signal FS may be 93 Mhz, and the frequency of the second audio signal SS may be 105 Mhz. The audio source 102 may include a source processor 108, a first transmitter circuit 110, and a second transmitter circuit 112. The source processor 108, the first transmitter circuit 110, and the second transmitter circuit 112 may communicate with each other by way of a first communication channel 114. Examples of the first communication channel 114 may include a fiber optic cable, an ethernet cable, a co-axial cable, or the like. In an exemplary embodiment, the audio source 102 may be a radio station.

Source Processor 108:

The source processor 108 may include suitable circuitry that may be configured to perform one or more operations. For example, the source processor 108 may be configured to generate and transmit the first audio signal FS and the second audio signal SS to the system 104 by way of the first transmitter circuit 110 and the second transmitter circuit 112, respectively. The source processor 108 may be further configured to set the frequencies of each of the first audio signal FS and the second audio signal SS. Examples of the source processor 108 may be a central processing unit (CPU), a graphics processing unit (GPU), a microcontroller, an application-specific integrated circuit (ASIC), or the like.

First Transmitter Circuit 110:

The first transmitter circuit 110 may include suitable circuitry that may be configured to perform one or more operations. For example, the first transmitter circuit 110 may be configured to transmit the first audio signal FS to the system 104. The first transmitter circuit 110 may transmit the first audio signal FS to the system 104 by way of the communication network 106. Examples of the first transmitter circuit 110 may include an FM transmitter.

Second Transmitter Circuit 112:

The second transmitter circuit 112 may be structurally and functionally similar to the first transmitter circuit 110. The second transmitter circuit 112 may include suitable circuitry that may be configured to perform one or more operations. For example, the second transmitter circuit 112 may be configured to transmit the second audio signal SS to the system 104. The second transmitter circuit 112 may transmit the second audio signal SS to the system 104 by way of the communication network 106. Examples of the second transmitter circuit 112 may include an FM transmitter.

In another exemplary embodiment, the audio source 102 may be a broadcasting station that may include the source processor 108, the first transmitter circuit 110, and the second transmitter circuit 112. The source processor 108 may be a stationary or mobile live telecast unit, for example, that may transmit a first analog signal (not shown) to the first transmitter circuit 110 and the second transmitter circuit 112. For example, the data associated with the first analog signal may be a live feed of a soccer match. The source processor 108, the first transmitter circuit 110, and the second transmitter circuit 112 may communicate with each other by way of the first communication channel 114. The first transmitter circuit 110 and the second transmitter circuit 112 may be radio units that may broadcast the first analog signal by transmitting the first audio signal FS and the second audio signal SS to a number of electronic devices (e.g., the device of the system 104), respectively. The device may receive the first audio signal FS and the second audio signal SS.

System 104:

The system 104 may include suitable circuitry that may be configured to perform one or more operations. For example, the system 104 may be configured to receive the first audio signal FS and the second audio signal SS and output a plurality of blended blocks B1-BN. The plurality of blended blocks B1-BN may correspond to an audio output signal that is played by the system 104. The system 104 may include a first receiver 116, a second receiver 118, a first buffer 120, a second buffer 122, a host processor 124, and a digital signal processing (DSP) circuit 126.

First Receiver 116:

The first receiver 116 may be coupled to the first buffer 120 and the DSP circuit 126. The first receiver 116 may include suitable circuitry that may be configured to perform one or more operations. For example, the first receiver 116 may be configured to receive the first audio signal FS from the audio source 102. The first receiver 116 may be further configured to convert the first audio signal FS from an analog format to a digital format and provide a digitized version of the first audio signal FS (e.g., a plurality of first audio packets FP1-FPN) to the first buffer 120. In an example, the first receiver 116 may convert the first audio signal FS to the digital format by pulse code modulation (PCM). The first receiver 116 may be further configured to detect and provide a plurality of first power levels FV1-FVN of the first audio signal FS to the DSP circuit 126. Each power level of the plurality of first power levels FV1-FVN may be indicative of a power strength of the first audio signal FS. The first receiver 116 may be further configured to provide the plurality of first power levels FV1-FVN to the DSP circuit 126 at predefined intervals of time. In an example, the first receiver 116 may provide the plurality of first power levels FV1-FVN to the DSP circuit 126 every 10 milliseconds (ms), although the time interval may be different. Each of the plurality of first power levels FV1-FVN may be in a range of 10 decibels (dB) to 100 dB, although the power levels may be lower or higher. In an example, a first power level FV1 of the plurality of first power levels FV1-FVN may be 30 dB. Examples of the first receiver 116 may include an FM receiver.

Second Receiver 118:

The second receiver 118 may be structurally and functionally similar to the first receiver 116. The second receiver 118 may be coupled to the second buffer 122 and the DSP circuit 126. The second receiver 118 may include suitable circuitry that may be configured to perform one or more operations. For example, the second receiver 118 may be configured to receive the second audio signal SS from the audio source 102. The second receiver 118 may be further configured to convert the second audio signal SS from an analog format to a digital format and provide a digitized version of the second audio signal SS (e.g., a plurality of second audio packets SP1-SPN) to the second buffer 122. The second receiver 118 may be further configured to detect and provide a plurality of second power levels SV1-SVN of the second audio signal SS to the DSP circuit 126. The second receiver 118 may be further configured to provide the plurality of second power levels SV1-SVN to the DSP circuit 126 at predefined intervals of time. Examples of the second receiver 118 may include an FM receiver.

First Buffer 120:

The first buffer 120 may be coupled with the first receiver 116, the host processor 124, and the DSP circuit 126. The first buffer 120 may include suitable circuitry that may be configured to store data. For example, the first buffer 120 may be configured to receive the digitized version of the first audio signal FS (e.g., the plurality of first audio packets FP1-FPN) from the first receiver 116. The first buffer 120 may be further configured to store the digitized version of the first audio signal FS (e.g., the plurality of first audio packets FP1-FPN) as a plurality of first audio blocks FB1-FBN. In an example, an audio block of the plurality of first audio blocks FB1-FBN may include five audio packets of the plurality of first audio packets FP1-FPN, although the number of audio packets may be different. Examples of the first buffer 120 may include a random-access memory (RAM), a read-only memory (ROM), a removable storage drive, a hard disk drive (HDD), a flash memory, a solid-state memory, and the like.

Second Buffer 122:

The second buffer 122 may be structurally and functionally similar to the first buffer 120. The second buffer 122 may be coupled with the second receiver 118, the host processor 124, and the DSP circuit 126. The second buffer 122 may include suitable circuitry that may be configured to store data. For example, the second buffer 122 may be configured to receive the digitized version of the second audio signal SS (e.g., the plurality of second audio packets SP1-SPN) from the second receiver 118. The second buffer 122 may be further configured to store the digitized version of the second audio signal SS (e.g., the plurality of second audio packets SP1-SPN) as a plurality of second audio blocks SB1-SBN. In an example, an audio block of the plurality of second audio blocks SB1-SBN may include five audio packets of the plurality of second audio packets SP1-SPN, although the number of audio packets may be different. Examples of the second buffer 122 may include a random-access memory (RAM), a read-only memory (ROM), a removable storage drive, a hard disk drive (HDD), a flash memory, a solid-state memory, and the like.

Host Processor 124:

The host processor 124 may be coupled to the first buffer 120, the second buffer 122, and the DSP circuit 126. The host processor 124 may include suitable circuitry that may be configured to perform one or more operations. For example, the host processor 124 may be configured to read the plurality of first audio blocks FB1-FBN and the plurality of second audio blocks SB1-SBN from the first buffer 120 and the second buffer 122, respectively. The host processor 124 may be further configured to determine a first delay value FD based on the plurality of first audio blocks FB1-FBN and the plurality of second audio blocks SB1-SBN. The first delay value FD indicates an expected delay between the plurality of first audio blocks FB1-FBN and the plurality of second audio blocks SB1-SBN. The host processor 124 may determine the first delay value FD based on historical data stored in a memory (not shown) associated with the host processor 124. In an embodiment, the historical data may include an expected delay value between FM signals based on the geographical location of the radio station (e.g., the audio source 102). In an example, the expected delay between FM signals may be 20 ms when the radio station (e.g., the audio source 102) may be near a mountain range, and the expected delay between FM signals may be 10 ms when the radio station (e.g., the audio source 102) may be near a river bed. The host processor 124 may be further configured to receive a ready signal RS from the DSP circuit 126. The ready signal RS may indicate a request to initiate analysis of a plurality of first audio quality scores (shown in FIG. 3B) and a plurality of second audio quality scores (shown in FIG. 3B) as explained in the ongoing description. Each audio quality score of the plurality of first audio quality scores (shown in FIG. 3B) and the plurality of second audio quality scores (shown in FIG. 3B) may indicate an audio quality of a corresponding audio block of the plurality of first audio blocks FB1-FBN and the plurality of second audio blocks SB1-SBN, respectively. The host processor 124 may be further configured to determine, based on the reception of the ready signal RS, whether the DSP circuit 126 may initiate the analysis of the plurality of first audio quality scores (shown in FIG. 3B) and the plurality of second audio quality scores (shown in FIG. 3B). The host processor 124 may be further configured to generate a confirmation signal CS based on the determination. The confirmation signal CS may be generated to confirm that the request to initiate the analysis of the plurality of first audio quality scores (shown in FIG. 3B) and the plurality of second audio quality scores (shown in FIG. 3B) is accepted. In an example, the host processor 124 may generate the confirmation signal CS based on the determination that a previous functional request of the system 104 is executed. In another example, the host processor 124 may delay the generation of the confirmation signal CS based on the determination that an ongoing functional request of the system 104 is being executed.

DSP Circuit 126:

The DSP circuit 126 may be coupled to the first receiver 116, the second receiver 118, the first buffer 120, the second buffer 122, and the host processor 124. The DSP circuit 126 may include suitable circuitry that may be configured to perform one or more operations. For example, the DSP circuit 126 may be configured to read the plurality of first audio blocks FB1-FBN of the first audio signal FS and the plurality of second audio blocks SB1-SBN of the second audio signal SS from the first buffer 120 and the second buffer 122, respectively. The DSP circuit 126 may be further configured to read the first buffer 120 and the second buffer 122 at predefined intervals of time. In an example, the DSP circuit 126 may read the first buffer 120 and the second buffer 122 every 10 ms, although the time interval may be different. The DSP circuit 126 may be further configured to read a sub-plurality of first audio packets of the plurality of first audio packets FP1-FPN and a sub-plurality of second audio packets of the plurality of second audio packets SP1-SPN. The sub-plurality of first audio packets and the sub-plurality of second audio packets are stored by the first buffer 120 and the second buffer 122 as a corresponding audio block of the plurality of first audio blocks FB1-FBN and a corresponding audio block of the plurality of second audio blocks SB1-SBN at the predefined intervals of time, respectively. In an example, an audio block of the plurality of first audio blocks FB1-FBN and the plurality of second audio blocks SB1-SBN may include five audio packets of the plurality of first audio packets FP1-FPN and the plurality of second audio packets SP1-SPN, respectively, although the number of audio blocks may be different.

The number of audio packets in an audio block (e.g. a length of the audio block) of the plurality of first audio blocks FB1-FBN and the plurality of second audio blocks SB1-SBN may be based on the frequency of the first audio signal FS and the second audio signal SS, respectively. For example, the number of audio packets in the audio block of the plurality of first audio blocks FB1-FBN may be 512 when the frequency of the first audio signal FS is 44.1 kilohertz (kHz) thereby achieving a higher frequency resolution. In such an example, the frequency resolution of the first audio signal FS may be 43 hz per frequency bin. The DSP circuit 126 may extract a plurality of first audio parameters and a plurality of second audio parameters upon reading the plurality of first audio blocks FB1-FBN and the plurality of second audio blocks SB1-SBN, respectively.

The DSP circuit 126 may be further configured to execute a time to frequency domain operation, on the plurality of first audio blocks FB1-FBN and the plurality of second audio blocks SB1-SBN to generate a plurality of third audio blocks and a plurality of fourth audio blocks, respectively. In an example, the plurality of first audio blocks FB1-FBN and the plurality of second audio blocks SB1-SBN are in the time domain, and the plurality of third audio blocks and the plurality of fourth audio blocks are in the frequency domain. Prior to executing the time to frequency domain operation, the DSP circuit 126 may be further configured to generate a plurality of first intermediate blocks (not shown) and a plurality of second intermediate blocks (not shown) based on the plurality of first audio blocks FB1-FBN and the plurality of second audio blocks SB1-SBN, respectively. Each of the plurality of first intermediate blocks and the plurality of second intermediate blocks may be short audio blocks.

To generate the plurality of first intermediate blocks, the DSP circuit 126 may be further configured to combine (e.g. overlap) each of the plurality of first audio blocks FB1-FBN. The DSP circuit 126 may combine a current audio block of the plurality of first audio blocks FB1-FBN with one of a preceding audio block of the plurality of first audio blocks FB1-FBN and a subsequent audio block of the plurality of first audio blocks FB1-FBN to generate a corresponding intermediate block. For example, the DSP circuit 126 may combine the first audio block FB1 and the second audio block FB2 to generate a first intermediate block of the plurality of first intermediate blocks. Further, the DSP circuit 126 may combine the second audio block FB2 and the third audio block FB3 to generate a second intermediate block of the plurality of first intermediate blocks. Similarly, the DSP circuit 126 may generate the plurality of second intermediate blocks in a manner similar to the generation of the plurality of first intermediate blocks.

The DSP circuit 126 may be further configured to execute a sine window operation on the plurality of first intermediate blocks and the plurality of second intermediate blocks to reduce window artifacts that may occur during the execution of the time to frequency domain operation on the plurality of first audio blocks FB1-FBN and the plurality of second audio blocks SB1-SBN. The window artifacts may be reduced by smoothing the boundary frequencies of each of the plurality of first intermediate blocks and the plurality of second intermediate blocks. The time to frequency domain operation is thus executed on the plurality of first intermediate blocks and the plurality of second intermediate blocks to generate the plurality of third audio blocks and the plurality of fourth audio blocks, respectively.

The plurality of third audio blocks and the plurality of fourth audio blocks may be provided to a trained machine learning model (shown in FIG. 3B) to extract the plurality of first audio parameters and the plurality of second audio parameters, respectively. Examples of the time to frequency domain operations include a fast fourier transform, a cosine transform, or the like.

The DSP circuit 126 may be further configured to extract, by executing the trained machine learning model (shown in FIG. 3B), the plurality of first audio parameters associated with the plurality of first audio blocks FB1-FBN (e.g., the plurality of third audio blocks) of the first audio signal FS and the plurality of second audio parameters associated with the plurality of second audio blocks SB1-SBN (e.g., the plurality of fourth audio blocks) of the second audio signal SS. To obtain the trained machine learning model (shown in FIG. 3B), the DSP circuit 126 may be further configured to train a first machine learning model (shown in FIG. 3A). Each of the plurality of first and second audio parameters may include a spectral centroid, a spectral flux, and a noise floor of each of the plurality of first audio blocks FB1-FBN and the plurality of second audio blocks SB1-SBN, respectively.

The spectral centroid may determine an average frequency of each of the plurality of first audio blocks FB1-FBN and the plurality of second audio blocks SB1-SBN.

The spectral centroid of each of the plurality of first audio blocks FB1-FBN and the plurality of second audio blocks SB1-SBN may be extracted by equation (1):

$$\text{Spectral Centroid}(SC) = \frac{\sum_{i=1}^{n} fi * Ai}{\sum_{i=1}^{n} Ai} \tag{1}$$

where 'n' is a total number of frequency bins (e.g., total number of different frequencies present in an audio block of the plurality of first audio blocks FB1-FBN and the plurality of second audio blocks SB1-SBN), 'fi' is a frequency of the $i^{th}$ frequency bin, and '$A_i$' is a magnitude (or amplitude) of the $i^{th}$ frequency bin.

A value of the spectral centroid of an audio block of the plurality of first audio blocks FB1-FBN and the plurality of second audio blocks SB1-SBN may indicate the presence of noise in the audio block. A high value of the spectral centroid may indicate that the audio block may be affected by noise, and a low value of spectral centroid may indicate that the audio block may remain unaffected by noise. Thus, a low spectral centroid of an audio block is desirable. Thus, the value of the spectral centroid of each of the plurality of blended blocks B1-BN may be low.

Spectral flux (SF) may quantify a rate at which an energy distribution of frequency bands of the plurality of first audio blocks FB1-FBN and the plurality of second audio blocks SB1-SBN may change over a time period. The spectral flux may be extracted by equation (2):

$$\text{Spectral flux}(SF)[n] = \sqrt{\sum_{k=1}^{K} (S[k, n] - S[k, n-1])\hat{\ }2} \tag{2}$$

where 'K' is the total number of frequency bins (e.g., total number of different frequencies present in an audio block of the plurality of first audio blocks FB1-FBN and the plurality of second audio blocks SB1-SBN), and 'S[k,n]' is the magnitude of the $k^{th}$ frequency bin in the $n^{th}$ time frame. The $N^{th}$ time frame corresponds to a predefined number of time blocks that are required for the determination of the spectral flux.

A high spectral flux of the audio block may indicate several transitions in the audio block as compared to a corresponding previous block of one of (i) the plurality of first audio blocks FB1-FBN and (ii) the plurality of second audio blocks SB1-SBN. A low spectral flux may indicate similar or zero transitions or events as compared to the previous block. Further, a low spectral flux of the audio block may indicate that the audio block may be affected by noise. Thus, a high spectral flux of an audio block is desirable.

To determine the noise floor of the audio block, the DSP circuit 126 may be further configured to determine a global minima and a local minima for the plurality of first audio blocks FB1-FBN and the plurality of second blocks SB1-SBN. The value of global minima may indicate an amount of comfort noise that may be present in the first audio signal FS and the second audio signal SS. Comfort noise of the first audio signal FS and the second audio signal SS may be indicative of a background noise (such as an environmental noise) that may be added to the first audio signal FS and the second audio SS in an absence of audio in the first audio signal FS and the second audio signal SS. The DSP circuit 126 may update the value of global minima in real-time upon receiving each audio block of the plurality of first audio blocks FB1-FBN and each audio block of the plurality of the second audio blocks SB1-SBN at a given time instance.

Local minima may indicate a total amount of noise present in the first audio signal FS and the second audio signal SS in a predefined interval of time (e.g., 3 seconds). The local minima may thus be based on an amount of environmental interference or other undesired artifacts. The DSP circuit 126 may determine the local minima by detecting a minimum frequency for each frequency band of the plurality of first audio blocks FB1-FBN and the plurality of second audio blocks SB1-SBN at each predefined interval of time (e.g., 3 seconds) to avoid false peaks. Further, the DSP circuit 126 may determine the local minima by determining a minimum frequency for a range of selective frequency bands (e.g. frequency bands of 5 kHz to 19 kHz) of the plurality of first audio blocks FB1-FBN and the plurality of second audio blocks SB1-SBN that may be affected by noise.

The DSP circuit 126 may determine the noise floor of an audio block of the plurality of first audio blocks FB1-FBN and the plurality of second audio blocks SB1-SBN by subtracting the global minima from the local minima of the audio block. A high noise floor may indicate that an audio block may be affected due to noise. Thus, a low noise floor of an audio block is desirable.

The DSP circuit 126 may be further configured to process, by further executing the trained machine learning model (shown in FIG. 3B), the plurality of first audio parameters and the plurality of second audio parameters to generate the plurality of first audio quality scores (shown in FIG. 3B) and the plurality of second audio quality scores (shown in FIG. 3B), respectively. Each audio quality score of the plurality of first audio quality scores (shown in FIG. 3B) and the plurality of second audio quality scores (shown in FIG. 3B) may indicate an audio quality of a corresponding audio block of the plurality of first audio blocks FB1-FBN and the plurality of second audio blocks SB1-SBN, respectively. The plurality of first audio quality scores (shown in FIG. 3B) and the plurality of second audio quality scores (shown in FIG. 3B) may be generated based on the international telecommunication union (ITU) five-grade impairment scale in the radiocommunication sector, or using another suitable audio quality scoring paradigm. The ITU five-grade impairment scale may be used in the evaluation of an audio quality of an audio signal. The grades are in the range of 1 to 5, where different labels are given for each grade. A higher audio quality score may indicate a higher audio quality. The highest audio quality score of "5" may be labeled as "imperceptible," indicating that an effect of noise on the audio signal is imperceptible. The audio quality score of "4" may be labeled as "perceptible but not annoying" to indicate that the effect of noise on the audio signal is perceptible but not annoying. The audio quality score of "3" may be labeled as "slightly annoying" to indicate that the effect of noise on the audio signal is slightly annoying. The audio quality score of "2" may be labeled as "annoying," indicating that the effect of noise on the audio signal is annoying. Further, the audio quality score of "1" may be labeled as "very annoying" to indicate that the effect of noise on the audio signal is very annoying. The audio quality score "3" of the impairment quality label "slightly annoying" may be the threshold score.

Figure 3A:
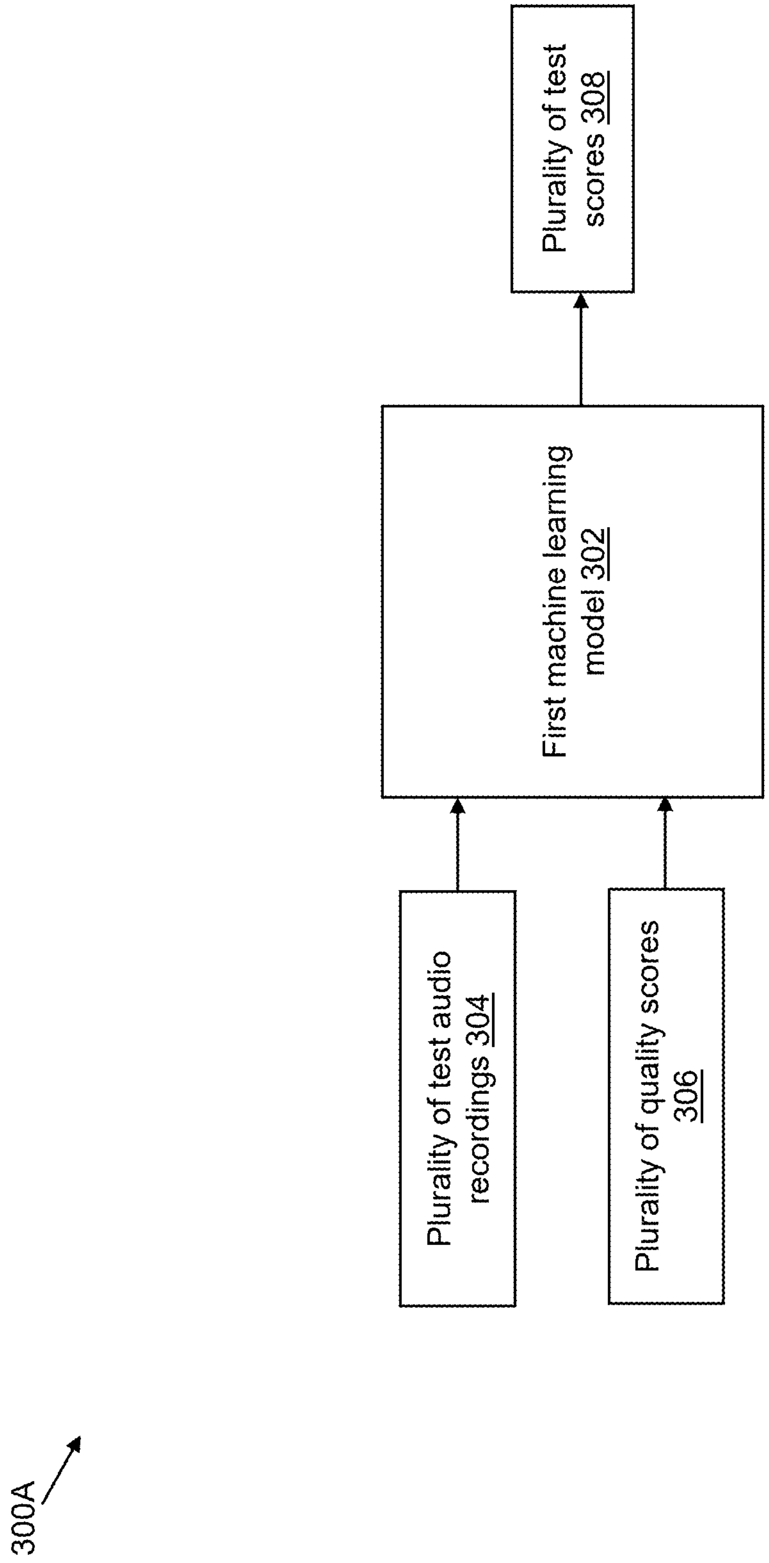
FIG. 3A represents a block diagram that illustrates training of a first machine learning model of the FM environment of FIG. 1 in accordance with an exemplary embodiment of the present disclosure.
Figure 3B:
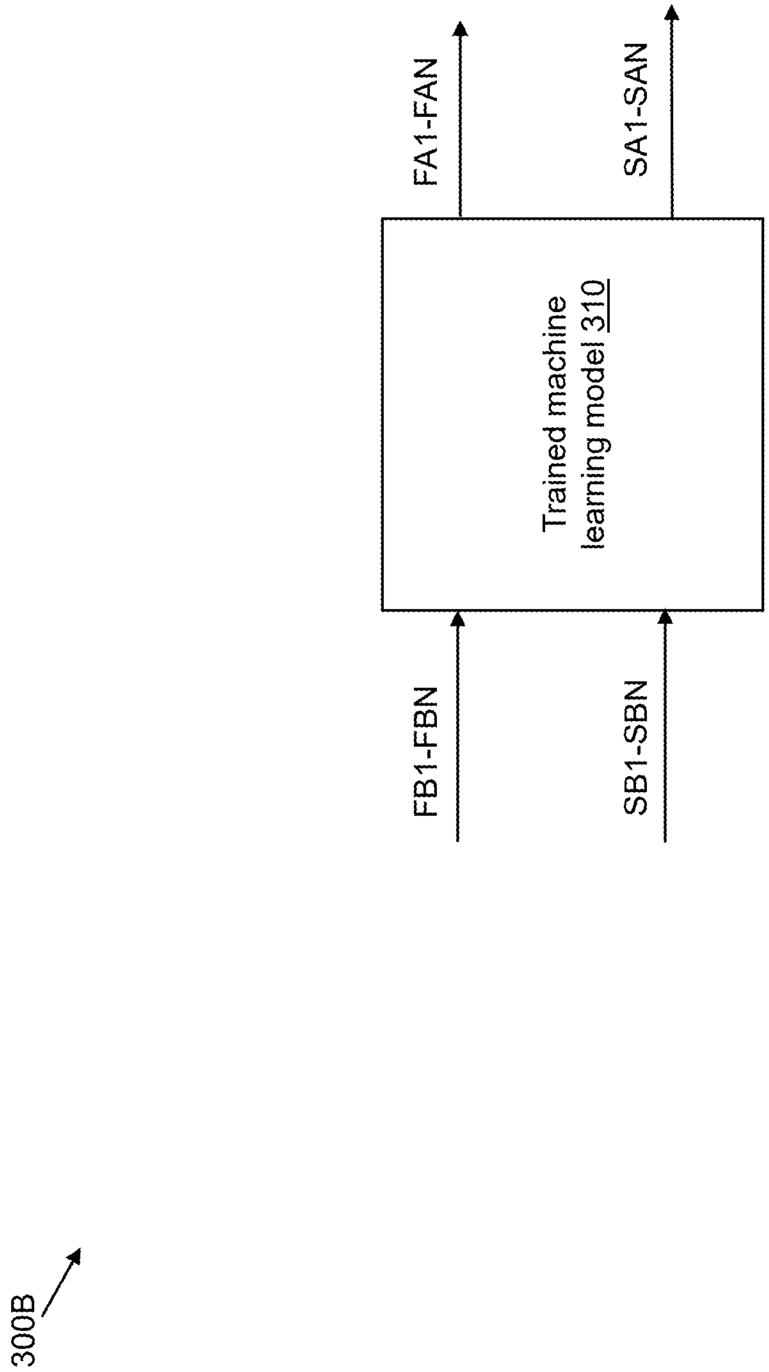
FIG. 3B represents a block diagram that illustrates an implementation of a trained machine learning model obtained after training the first machine learning model of FIG. 3A in accordance with an exemplary embodiment of the present disclosure.

The DSP circuit 126 may be further configured to receive from the host processor 124, the first delay value FD that may indicate an expected delay between the plurality of first audio blocks FB1-FBN and the plurality of second audio blocks SB1-SBN prior to analyzing the plurality of first audio quality scores (shown in FIG. 3B) and the plurality of second audio quality scores (shown in FIG. 3B). The DSP circuit 126 may be further configured to convolute the plurality of first audio blocks FB1-FBN and the plurality of second audio blocks SB1-SBN based on the first delay value FD, the plurality of first audio quality scores (shown in FIG. 3B), and the plurality of second audio quality scores (shown in FIG. 3B) to determine an actual delay value between the plurality of first audio blocks FB1-FBN and the plurality of second audio blocks SB1-SBN. The actual delay value is hereinafter referred to as "a second delay value SD." The DSP circuit 126 may convolute the plurality of second audio blocks SB1-SBN and the plurality of first audio blocks FB1-FBN by way of a first cross-correlation method to measure similarity between the first audio signal FS and the second audio signal SS as a function of displacement relative to each other. Based on the execution of the first cross correlation, the second delay value SD is determined. The DSP circuit 126 may be further configured to detect that the plurality of first audio blocks FB1-FBN and the plurality of second audio blocks SB1-SBN may be out of sync during the determination of the second delay value SD. The convolution between the plurality of first audio blocks FB1-FBN and the plurality of second audio blocks SB1-SBN may be extracted by equation (3):

$$x[n] \circledast h[n] = \sum_{k=0}^{N-1} x[k] * h[(n-k) \bmod N] \tag{3}$$

where 'x[k]' is an audio block of the plurality of first audio blocks FB1-FBN and 'h[k]' is an audio block of the plurality of second audio blocks SB1-SBN, '$\circledast$' denotes an operator for convolution (e.g., circular convolution), and N corresponds to a predefined number of audio blocks of the plurality of first audio blocks FB1-FBN and the plurality of second audio blocks SB1-SBN that are required to determine the second delay value SD. The convolution may involve multiplying audio blocks of the plurality of first audio blocks FB1-FBN and the plurality of second audio blocks SB1-SBN that are shifted by index 'k' for a plurality of times and summing each result of the multiplication. The 'mod' operation may ensure that a first index and a last index are the same, thereby causing the convolution to be circular.

The DSP circuit 126 may be further configured to generate the ready signal RS based on the second delay value SD. The DSP circuit 126 may be further configured to provide the ready signal RS to the host processor 124. The DSP circuit 126 may be further configured to receive, from the host processor 124, the confirmation signal CS based on the ready signal RS. The host processor 124 may generate the confirmation signal CS to confirm that the request to initiate the analysis of the plurality of first audio quality scores (shown in FIG. 3B) and the plurality of second audio quality scores (shown in FIG. 3B) is accepted.

The DSP circuit 126 may be further configured to receive the plurality of first power levels FV1-FVN and the plurality of second power levels SV1-SVN from the first receiver 116 and the second receiver 118, respectively. The DSP circuit 126 may be further configured to determine whether a first power level FV1 of the plurality of first power levels FV1-FVN and a corresponding second power level SV1 of the plurality of second power levels SV1-SVN are greater than a threshold power level prior to analysis of the plurality of first audio quality scores (shown in FIG. 3B) and the plurality of second audio quality scores (shown in FIG. 3B). The threshold power level may be a minimum power level indicating an acceptable strength of the first audio signal FS and the second audio signal SS, respectively. In an exemplary scenario, the system 104 may receive the first audio signal FS and the second audio signal SS for a predefined time period (e.g., 10 seconds). For a first predefined time period (e.g., four seconds), the DSP circuit 126 may determine whether the plurality of first power levels FV1-FVN and the plurality of second power levels SV1-SVN may be greater than the threshold power level. When the plurality of first power levels FV1-FVN and the plurality of second power levels SV1-SVN are determined to be greater than the threshold power level, the DSP circuit 126 may continue to analyse the plurality of first audio quality scores (shown in FIG. 3B) and the plurality of second audio quality scores (shown in FIG. 3B) to output the plurality of blended blocks B1-BN. At a second time instance of the predefined time period (e.g., at the fifth second), the DSP circuit 126 may determine that at least one of the plurality of first power levels FV1-FVN is below the threshold power level. When at least one of the plurality of first power levels FV1-FVN falls below the threshold power level at the second time instance, the first receiver 116 is unable to receive the first audio signal FS at the second time instance. Thus, the first receiver 116 may fail to provide the digitized version of the first audio signal FS (e.g., the plurality of first audio packets FP1-FPN) to the first buffer 120 at the second time instance, leading to an empty state of the first buffer 120 at the second time instance. The DSP circuit 126 may output a corresponding second audio block of the plurality of second audio blocks SB1-SBN at the second time instance as the corresponding blended block. For the sake of simplicity of explaining the ongoing description, it is assumed that the each of the first power levels FV1-FVN and the plurality of second power levels SV1-SVN may be greater than or equal to the threshold power level.

The DSP circuit 126 may be further configured to analyze the plurality of first audio quality scores (shown in FIG. 3B) and the plurality of second audio quality scores (shown in FIG. 3B) by identifying whether each audio quality score of the plurality of first audio quality scores (shown in FIG. 3B) and each corresponding audio quality score of the plurality of second audio quality scores (shown in FIG. 3B) is greater than a threshold score. The threshold score may indicate an acceptable quality score of the plurality of first audio blocks FB1-FBN and the plurality of second audio blocks SB1-SBN. The DSP circuit 126 may be further configured to tune a first audio block FB1 of the plurality of first audio blocks FB1-FBN and a corresponding second audio block SB1 of the plurality of second audio blocks SB1-SBN based on the detection that at least one of the first audio block FB1 and the corresponding second audio block SB1 is out of sync by the second delay value SD. The DSP circuit 126 may detect that the plurality of first audio blocks FB1-FBN and the plurality of second audio blocks SB1-SBN may be out of sync during the determination of the second delay value SD. The DSP circuit 126 may tune the audio blocks by executing a second cross-correlation method. The DSP circuit 126 may execute the second cross-correlation method as a function of the second delay value SD to tune the plurality of first audio blocks FB1-FBN and the plurality of second audio blocks SB1-SBN. The DSP circuit 126 may tune based on the analysis of the plurality of first audio quality scores (shown in FIG. 3B) and the plurality of second audio quality scores (shown in FIG. 3B). The DSP circuit 126 may be further configured to blend the first audio block FB1 with the corresponding second audio block SB1 to output a blended block of the plurality of blended blocks FB1-FBN. The first audio block FB1 may be blended with the corresponding second audio block SB1 upon tuning one of the first audio block FB1 and the corresponding second audio block SB1. The blending of the plurality of first audio blocks FB1-FBN and the plurality of second audio blocks SB1-SBN will be explained in detail in FIG. 2. The DSP circuit 126 may be further configured to output upon analyzing the plurality of first audio quality scores (shown in FIGS. 2 and 3B) and the plurality of second audio quality scores (shown in FIGS. 2 and 3B), the plurality of blended blocks B1-BN. Each of the plurality of blended blocks B1-BN is at least one of a first audio block of the plurality of first audio blocks FB1-FBN and a second audio block of the plurality of second audio blocks SB1-SBN. The DSP circuit 126 will be explained in detail in FIG. 4.

Figure 2:
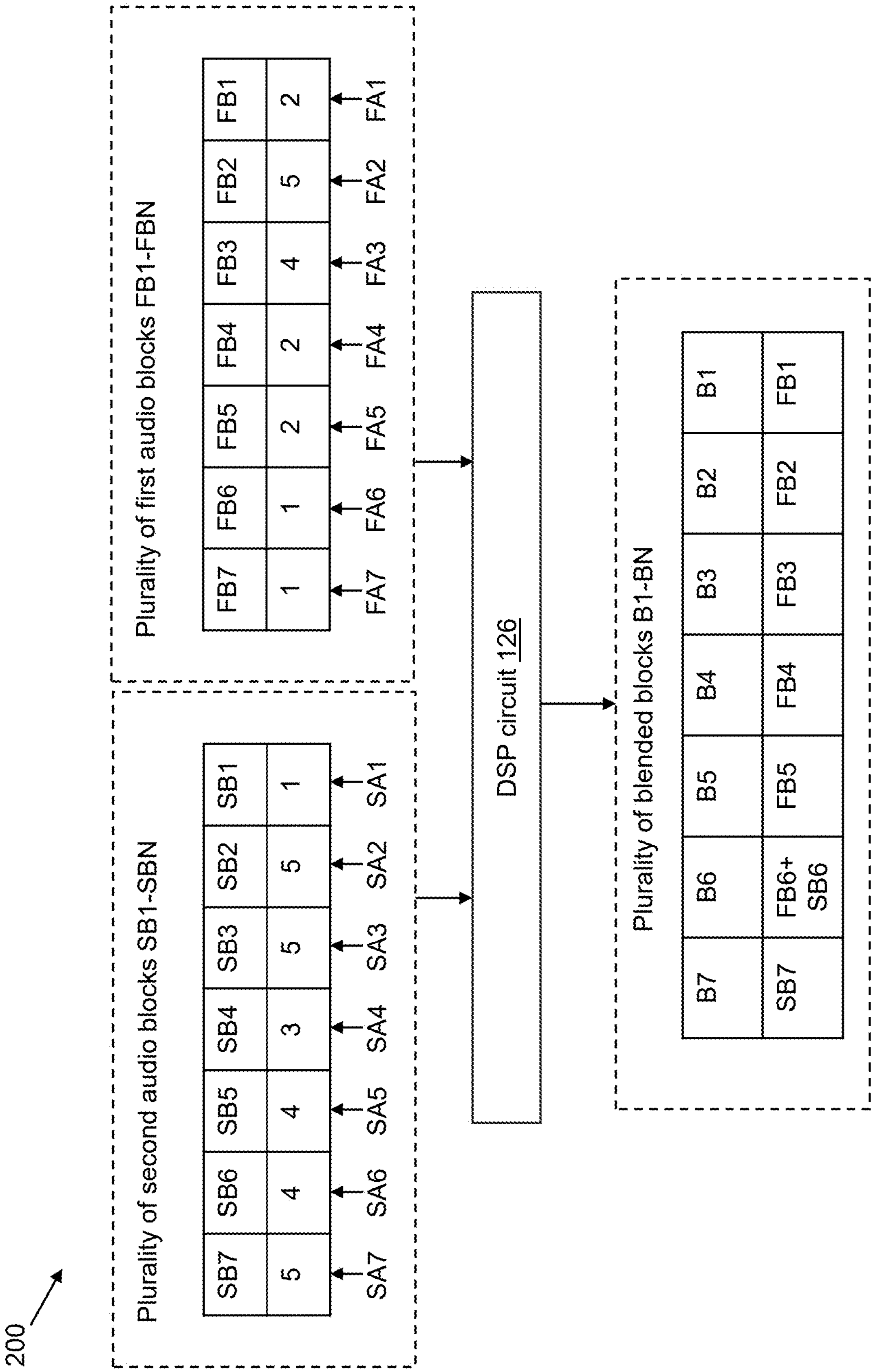
FIG. 2 represents an exemplary scenario illustrating blending of a plurality of first audio blocks and a plurality of second audio blocks by a digital signal processing (DSP) circuit of the FM environment of FIG. 1 in accordance with an embodiment of the present disclosure.

FIG. 2 collectively represents an exemplary scenario 200 illustrating the blending of the plurality of blended blocks B1-BN by the DSP circuit 126 in accordance with an embodiment of the present disclosure.

The plurality of first audio blocks FB1-FBN are shown to include first through seventh audio blocks FB1-FB7. In an example, the seventh audio block FB7 is subsequent to the sixth audio block FB6. The plurality of first audio quality scores (shown in FIG. 3B) may include first through seventh audio quality scores FA1-FA7 of the first through seventh audio blocks FB1-FB7, respectively. The first through seventh audio quality scores FA1-FA7 may be '2', '5', '4', '2', '2', '1', and '1', respectively. The plurality of second audio blocks SB1-SBN are shown to include eighth through fourteenth audio blocks SB1-SB7. In an example, the fourteenth audio block SB7 is subsequent to the thirteenth audio block SB6. In addition, each audio block of the plurality of first audio blocks FB1-FBN corresponds to one of the plurality of second audio blocks SB1-SBN. In an example, the first audio block FB1 corresponds to the eighth audio block SB1. The plurality of second audio quality scores (shown in FIG. 3B) may include eighth through fourteenth audio quality scores SA1-SA7 of the eighth through fourteenth audio blocks SB1-SB7. The eighth through fourteenth audio quality scores SA1-SA7 are '1', '5', '5', '3', '4', '4', and '5', respectively. The DSP circuit 126 may identify whether each audio quality score of the first through seventh audio quality scores FA1-FA7 and each corresponding audio quality score of the eighth through fourteenth audio quality scores SA1-SA7 is greater than a threshold score. In an example, to output a first blended block B1 of the plurality of blended blocks B1-BN, the DSP circuit 126 may identify whether the first audio quality score FA1 and the eighth audio quality score SA1 are greater than the threshold score. For example, the threshold score may be '3'. The first audio quality score FA1 '2' and the eighth audio quality score SA1 '1' are lower than the threshold score '3'. However, the first audio quality score FA1 '2' is greater than the eighth audio quality score SA1 '1'. Thus, the first audio block FB1 may be outputted as the first blended block B1 by the DSP circuit 126. Similarly, to output a second blended block B2 of the plurality of blended blocks B1-BN, the DSP circuit 126 may identify whether the second audio quality score FA2 and the ninth audio quality score SA2 are greater than the threshold score. The second audio quality score FA2 '5' and the ninth audio quality score SA2 '5' are equal and greater than the threshold score '3'. In such a scenario, upon identifying that at least one audio quality score of the plurality of first audio quality scores (e.g., the second audio quality score FA2) and the plurality of second audio quality scores (e.g., the tenth audio quality scores SA2) is greater than the threshold score, the DSP circuit 126 may detect a previous blended block of the plurality of blended blocks B1-BN to output one of the plurality of blended blocks B1-BN. The previous blended block (e.g., the first blended block B1) is detected to be the first audio block FB1. Upon detecting that the first blended block B1 is the previous blended block, the second audio block FB2 may be outputted as a current blended block (e.g., the second blended block B2) of the plurality of blended blocks B1-BN.

To output a third blended block B3 of the plurality of blended blocks B1-BN, the DSP circuit 126 may identify whether the third audio quality score FA3 and the tenth audio quality score SA3 are greater than the threshold score. Upon identifying that the third audio quality score FA3 '4' and the tenth audio quality score SA3 '5' are greater than the threshold score '3' and the tenth audio quality score SA3 '5' is greater than the third audio quality score FA3 '4', the DSP circuit 126 may detect a previous blended block of the plurality of blended blocks B1-BN. The previous blended block (e.g., the second blended block B2) is detected to be the second audio block FB2. Upon detecting that the second audio block FB2 is the previous blended block, the third audio block FB3 may be outputted as the current blended block (e.g., the third blended block B3) of the plurality of blended blocks B1-BN.

To output a fourth blended block B4 of the plurality of blended blocks B1-BN, the DSP circuit 126 may identify whether the fourth audio quality score FA4 and the eleventh audio quality score SA4 are greater than the threshold score. The fourth audio quality score FA4 '2' is lower than the threshold score '3' and the eleventh audio quality score SA4 '3' equals the threshold score '3'. The DSP circuit 126 may detect a previous blended block of the plurality of blended blocks B1-BN. The previous blended block (e.g., the third blended block B3) is detected to be the third audio block FB3. Upon detecting that the third audio block FB3 is the previous blended block, the fourth audio block FB4 may be outputted as the current blended block (e.g., the fourth blended block B4) of the plurality of blended blocks B1-BN. Though the eleventh audio quality score SA4 '3' equals the threshold score and is greater than the corresponding fourth audio quality score FA4 '2', the DSP circuit 126 may avoid blending the fourth audio block FB4 and the eleventh audio block SB4 until a number of a sub-plurality of audio blocks have audio quality scores lower than the threshold score. Thus, the DSP circuit 126 may blend after a number of audio blocks having audio quality scores lower than the threshold score is greater than or equal to the number of such sub-plurality of audio blocks. In an example, a number of the sub-plurality of audio blocks is two, although it may be a different number (e.g., three, four, etc.). The DSP circuit 126 typically avoids blending for the number of audio blocks that are lower than the number of the sub-plurality of audio blocks to reduce processing overhead that may have occurred due to constant blending between the audio blocks.

The DSP circuit 126 may predict that the fifth audio quality score FA5 and the sixth audio quality scores FA6 of the subsequent audio blocks (such as the fifth audio block FB5 and the sixth audio block FB6) of the plurality of first audio blocks FB1-FBN may fall below the threshold score as the fourth audio quality score FA4 of the fourth audio block FB4 is below the threshold score. In such a scenario, the DSP circuit 126 may further predict that blending of the plurality of first audio blocks FB1-FBN to the plurality of second audio blocks SB1-SBN may be essential when the audio quality scores of the number of the sub-plurality of audio blocks of the plurality of first audio blocks FB1-FBN fall below the threshold score. Though it will be apparent to a person skilled in the art that in the present disclosure, the number of such sub-plurality of audio blocks is two, in various other embodiments, the number of the sub-plurality of audio blocks may be greater than two. Further, the DSP circuit 126 may determine the number of the sub-plurality of audio blocks based on multiple factors, such as location of the device, data associated with blending of previous audio signals, and the like.

To output a fifth blended block B5 of the plurality of blended blocks B1-BN, the DSP circuit 126 may identify whether the fifth audio quality score FA5 and the twelfth audio quality score SA5 are greater than the threshold score. The fifth audio quality score FA5 '2' is lower than the threshold score '3', and the twelfth audio quality score SA5 '4' is greater than the threshold score '3'. The DSP circuit 126 may detect a previous blended block of the plurality of blended blocks B1-BN. In addition, the DSP circuit 126 may detect whether the number of the sub-plurality of audio blocks having lower threshold scores is less than two. The previous blended block (e.g., the first blended block B1) is detected to be the fourth audio block FB4 and the audio blocks of the plurality of first audio blocks FB1-FBN having lower threshold scores remain below two. Upon detecting that the fourth blended block B4 is the previous blended block, and the number of the sub-plurality of audio blocks is one, the fifth audio block FB5 may be outputted as a current blended block (e.g., the fifth blended block B5) of the plurality of blended blocks B1-BN.

To output a sixth blended block B6 of the plurality of blended blocks B1-BN, the DSP circuit 126 may identify whether the sixth audio quality score FA6 and the thirteenth audio quality score SA6 are greater than the threshold score. The sixth audio quality score FA6 '1', is lower than the threshold score '3', and the thirteenth audio quality score SA6 '4' is greater than the threshold score '3'. The DSP circuit 126 may detect a previous blended block of the plurality of blended blocks B1-BN. Further, the DSP circuit 126 may detect that the number of the sub-plurality of audio blocks is equal to the number two. The DSP circuit 126 may further detect whether the sixth audio block FB6 and the thirteenth audio block SB6 are out of sync by the second delay value SD. The DSP circuit 126 may tune one of the sixth audio block FB6 and the thirteenth audio block SB6 based on the detection that one of the sixth audio block FB6 and the thirteenth audio block SB6 is out of sync by the second delay value SD. The DSP circuit 126 may blend the sixth audio block FB6 and the thirteenth audio block SB6 to output the current blended block (e.g., sixth blended block B6) of the plurality of blended blocks FB1-FBN. The sixth blended block B6 may be outputted upon tuning one of the sixth audio block FB6 and the thirteenth audio block SB6 by the second delay value SD. In one embodiment, the sixth blended block B6 may have an equal composition of both the sixth audio block FB6 and the thirteenth audio block SB6 (e.g., B6=FB6+SB6). In another embodiment, the composition of the sixth audio block FB6 in the sixth blended block B6 may be greater than the composition of the thirteenth audio block SB6 in the sixth audio block B6. The composition of the sixth audio block FB6 and the thirteenth audio block SB6 in the sixth blended block B6 may be based on a level of smoothness essential for playing the audio output signal. The DSP circuit 126 may terminate the blending of the plurality of first audio blocks FB1-FBN and the plurality of second audio blocks SB1-SBN based on a predefined blended block value. Thus, the DSP circuit 126 may output one of the plurality of second audio blocks SB1-SBN after a number of audio blocks involved for blending is greater than or equal to the number of the predefined blended block value. In an example, the predefined blended block value is one. The DSP circuit 126 may store predefined blended block value in a memory (not shown) associated with the DSP circuit 126. The predefined blended block value may be determined based on the level of smoothness essential for playing the audio output signal. Though it will be apparent to a person skilled in the art that in the present disclosure, the predefined blended block value is one, in various other embodiments, the predefined blended block value may be greater than one.

In another exemplary embodiment, the sixth audio quality score FA6 and the thirteenth audio quality score SA6 are both lower than the threshold score. Thus, though the number of audio blocks of the plurality of first audio blocks FB1-FBN having lower threshold scores is equal to the number of the sub-plurality of audio blocks, the DSP circuit 126 may output the sixth audio block FB6 as the current blended output block (e.g., the sixth blended output block B6) of the plurality of blended audio blocks B1-BN based on the detection that the previous blended output block (e.g., the fifth blended output block B5) of the plurality of blended output blocks B1-BN is the fifth audio block FB5 and the thirteenth audio quality score SA6 is lower than the threshold score.

To output a seventh blended block B7 of the plurality of blended blocks B1-BN, the DSP circuit 126 may identify whether the seventh audio quality score FA7 and the fifteen audio quality score SA6 are greater than the threshold score. The seventh audio quality score FA7 '1' is lower than the threshold score '3', and the fourteenth audio quality score SA7 '5' is greater than the threshold score '3'. The DSP circuit 126 may detect a previous blended block of the plurality of blended blocks B1-BN. In addition, the DSP circuit 126 may detect whether a number of the sub-plurality of audio blocks involved in blending of the plurality of first audio blocks FB1-FBN and the plurality of second audio blocks SB1-SBN is less than the predefined blended block value. As the DSP circuit 126 detects that the number of the sub-plurality of audio blocks is equal to the predefined blended block value (e.g., the number one), the DSP circuit 126 may output the fourteenth audio block SB7 as the seventh blended block B7 of the plurality of blended blocks B1-BN. The blending of the plurality of first audio blocks FB1-FBN with the plurality of second audio blocks SB1-SBN to output the sixth blended block B6 indicates blending of the first audio signal FS and the second audio signal SS. Further, the early prediction of blending at the fourth blended block B4, results in a comparatively smoother audio played by the device as compared to conventional solutions.

FIG. 3A represents a block diagram 300A that illustrates training of a first machine learning model 302, in accordance with an exemplary embodiment of the present disclosure.

The DSP circuit 126 may be further configured to train the first machine learning model 302 based on training data to obtain the trained machine learning model (shown in FIG. 3B). The training data may include a plurality of test audio recordings 304 (e.g., analog FM data) and a plurality of quality scores 306 (e.g., audio quality labels of the analog FM data) such that the plurality of quality scores 306 may include a first quality score of a first test audio recording of the plurality of test audio recordings 304. The DSP circuit 126 may be further configured to receive the training data from an external memory (not shown). Each of the plurality of quality scores 306 may indicate an audio quality of the corresponding audio recording, where a low score may indicate a low quality of a test audio recording of the plurality of test audio recordings 304, and a high score may indicate a high quality of the test audio recording. The plurality of quality scores 306 may be generated either by a tester or an audio analysis model. The audio analysis model may be available in a number of commercial software (e.g., Opticom Opera) to enable the generation of the plurality of quality scores 306. Each of the plurality of quality scores 306 may be a perceptual evaluation of audio quality (PEAQ) score. The range of the PEAQ score may be from 1 to 5, where 1 represents the lowest quality, and 5 represents the highest quality. To generate the plurality of quality scores 306, the audio analysis model may compare a reference signal (e.g., an audio signal that remains unaffected under any external interferences) and a signal under test (e.g., an audio signal that is affected by external interferences). Each score of the plurality of quality scores 306 may be generated based on the ITU five-grade impairment scale or some other scoring paradigm.

To train the first machine learning model 302, the DSP circuit 126 may be further configured to extract a first plurality of training parameters (e.g. perceptual audio quality descriptors) of the first test audio recording. The first plurality of training parameters may be identical to the plurality of first audio parameters and the plurality of second audio parameters. The DSP circuit 126 may be further configured to determine, by way of a test scoring operation, a first test score of a plurality of test scores 308 based on processing of the first plurality of training parameters. Each of the plurality of test scores 308 may indicate an audio quality (e.g. a perceptual audio quality) of a corresponding test audio recording that may be determined by the first machine learning model 302. The test scoring operation may determine the first test score based on a mathematical equation. The mathematical equation may be based on weights assigned to each of the plurality of training parameters. The DSP circuit 126 may be further configured to compare the first test score with the first quality score to determine a match between the first test score and the first quality score. The match between the first test score and the first quality score may indicate to the first machine learning model 302 that the determination of the first test score by way of the test scoring operation is accurate. A mismatch between the first test score and the first quality score may indicate to the first machine learning model 302 that the determination of the first test score by way of the test scoring operation is erroneous. The DSP circuit 126 may be further configured to update the test scoring operation until a match is determined between the first test score and the first quality score. The test scoring operation may be updated by updating the weights of each of the plurality of training parameters of the mathematical equation. The first machine learning model 302 may be trained based on the match between the first test score and the first quality score. The trained machine learning model (shown in FIG. 3B) may generate the plurality of first audio quality scores (shown in FIG. 3B) and the plurality of second audio quality scores (shown in FIG. 3B) based on the training of the first machine learning model 302. Examples of the first machine learning model 302 may be a linear regression model, a logistic regression model, or the like.

In an embodiment, the DSP circuit 126 may continuously predict a dependent output variable (e.g., each of the plurality of test scores 308) based on one or more independent variables (e.g., the plurality of training parameters). Further, the DSP circuit 126 may execute the linear regression model as the first machine learning model 302 when the relationship between each of the plurality of test scores 308 and the plurality of training parameters is linear. In another embodiment, the DSP circuit 126 may execute the logistic regression model as the first machine learning model 302 to predict whether an instance of the dependent variable (e.g., a first test score of the plurality of test scores 308) belongs to a given class (e.g., the range of PEAQ scores).

FIG. 3B represents a block diagram 300B that illustrates an implementation of the trained machine learning model 310 obtained after training the first machine learning model 302, in accordance with an exemplary embodiment of the present disclosure. The trained machine learning model 310 may extract the plurality of first audio parameters associated with the plurality of first audio blocks FB1-FBN and the plurality of second audio parameters associated with the plurality of second audio blocks SB1-SBN. The trained machine learning model 310 may process the plurality of first audio parameters and the plurality of second audio parameters to generate the plurality of first audio quality scores FA1-FAN and the plurality of second audio quality scores SA1-SAN based on the plurality of first audio parameters and the plurality of second audio parameters, respectively.

Figure 4:
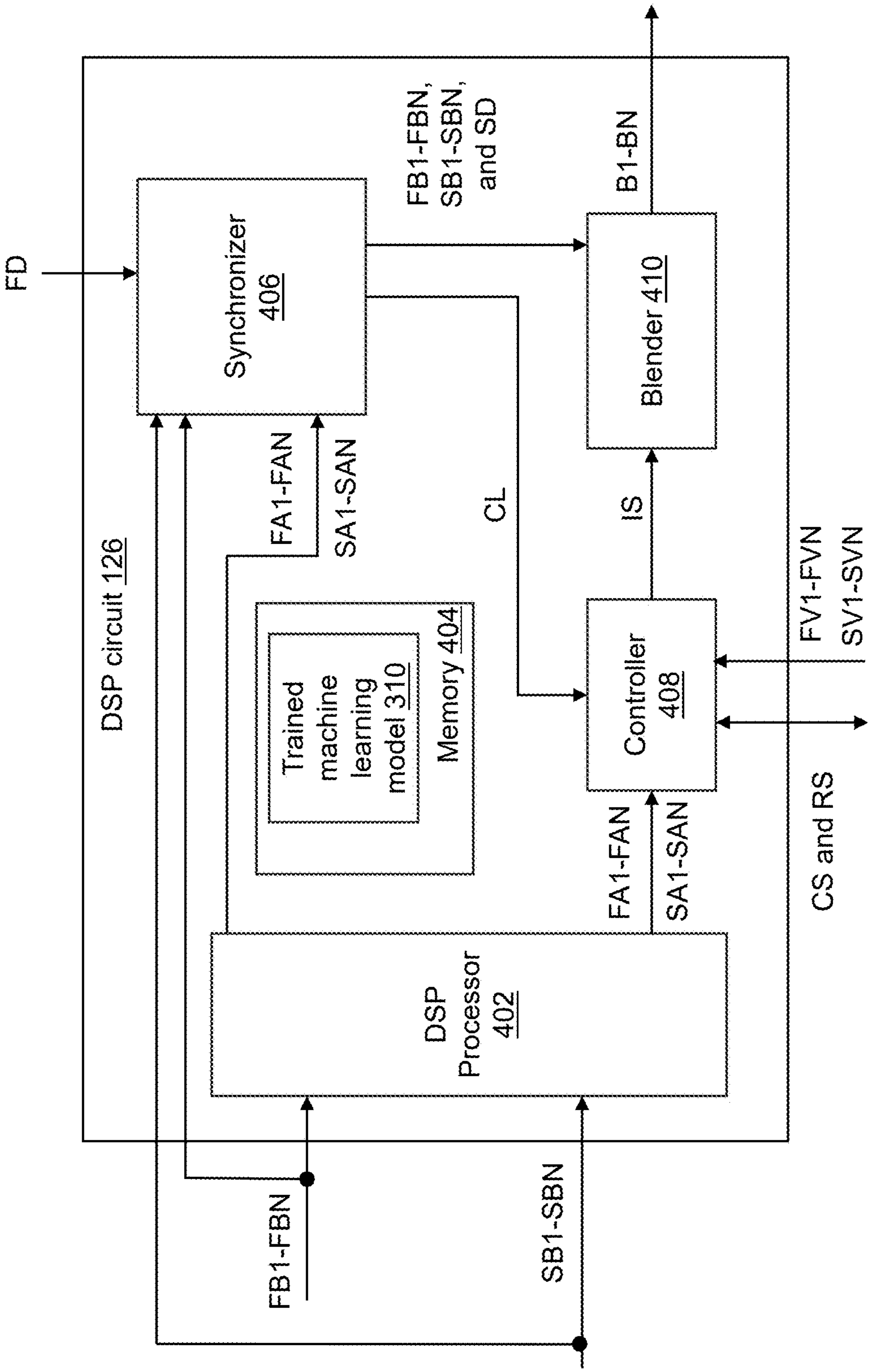
FIG. 4 represents a block diagram of the DSP circuit of the FM environment of FIG. 1 in accordance with an exemplary embodiment of the present disclosure.

FIG. 4 represents a block diagram of the DSP circuit 126, in accordance with an exemplary embodiment of the present disclosure. The DSP circuit 126 may include a DSP processor 402, a memory 404, a synchronizer 406, a controller 408, and a blender 410.

Memory 404:

The memory 404 may include suitable logic, circuitry, and/or interfaces for storing data. For example, the memory 404 may be configured to store the trained machine learning model 310. Examples of the memory 404 may include a random-access memory (RAM), a read-only memory (ROM), a removable storage drive, a hard disk drive (HDD), a flash memory, a solid-state memory, and the like.

DSP Processor 402:

The DSP processor 402 may be configured to train the first machine learning model 302 to obtain the trained machine learning model 310. The DSP processor 402 may read the plurality of first audio blocks FB1-FBN and the plurality of second audio blocks SB1-SBN from the first buffer 120 and the second buffer 122, respectively.

The DSP processor 402 may be further configured to execute a time to frequency domain operation, on the plurality of first audio blocks FB1-FBN and the plurality of second audio blocks SB1-SBN to generate the plurality of third audio blocks and the plurality of fourth audio blocks, respectively. In an example, the plurality of first audio blocks FB1-FBN and the plurality of second audio blocks SB1-SBN are in the time domain, and the plurality of third audio blocks and the plurality of fourth audio blocks are in the frequency domain. The DSP processor 402 may be further configured to execute the trained machine learning model 310 to extract the plurality of first audio parameters and the plurality of second audio parameters based on the plurality of third audio blocks and the plurality of fourth audio blocks, respectively. The DSP processor 402 may be further configured to generate the plurality of first audio quality scores FA1-FAN and the plurality of second audio quality scores SA1-SAN based on the processing of the plurality of first audio parameters and the plurality of second audio parameters by further executing the trained machine learning model 310, respectively. The trained machine learning model 310 may utilize a weighted mathematical equation that is based on the weights of each of the plurality of first audio parameters and the plurality of second audio parameters to generate the plurality of first audio quality scores FA1-FAN and the plurality of second audio quality scores SA1-SAN, respectively. Examples of the DSP processor 402 may be a CPU, a GPU, a microcontroller, an ASIC, or the like Synchronizer 406:

The synchronizer 406 may be configured to read the plurality of first audio blocks FB1-FBN and the plurality of second audio blocks SB1-SBN from the first buffer 120 and the second buffer 122, respectively. The synchronizer 406 may be further configured to receive the plurality of first audio quality scores FA1-FAN and the plurality of second audio quality scores SA1-SAN from the DSP processor 402. The synchronizer 406 may be further configured to receive the first delay value FD from the host processor 124. The synchronizer 406 may be further configured to convolute the plurality of first audio blocks FB1-FBN and the plurality of second audio blocks SB1-SBN to determine the second delay value SD. The synchronizer 406 may execute the first cross-correlation method as a function of the first delay value FD to convolute the plurality of first audio blocks FB1-FBN and the plurality of second audio blocks SB1-SBN. Prior to convolution of the plurality of first audio blocks FB1-FBN and the plurality of second audio blocks SB1-SBN, the synchronizer 406 may be further configured to determine a plurality of rejected audio blocks from the plurality of first audio blocks FB1-FBN and the plurality of second audio blocks SB1-SBN. The plurality of rejected audio blocks may be determined such that the corresponding audio quality scores of each of the plurality of rejected audio blocks are below the threshold score. The synchronizer 406 may further be configured to ignore the plurality of rejected audio blocks during the determination of the second delay value SD, thereby ensuring that the second delay value SD is determined accurately. The second delay value SD may be determined by the amount of shift required to determine the similarity between the plurality of first audio blocks FB1-FBN and the plurality of second audio blocks SB1-SBN. The synchronizer 406 may be further configured to generate and provide a completion signal CL to the controller 408, indicating that the second delay value SD is determined by the synchronizer 406. The synchronizer 406 may be further configured to provide the plurality of first audio blocks FB1-FBN, the plurality of second audio blocks SB1-SBN, and the second delay value SD to the blender 410. In an embodiment, the synchronizer 406 may be further configured to tune one audio block from one of the plurality of first audio blocks FB1-FBN and one of the plurality of second audio blocks SB1-SBN by the second delay value SD, prior to providing the plurality of first audio blocks FB1-FBN and the plurality of second audio blocks SB1-SBN to the blender 410. The synchronizer 406 may execute the second cross-correlation method as a function of the second delay value SD to tune the plurality of first audio blocks FB1-FBN and the plurality of second audio blocks SB1-SBN.

Controller 408:

The controller 408 may be configured to receive the plurality of first audio quality scores FA1-FAN and the plurality of second audio quality scores SA1-SAN from the DSP processor 402. The controller 408 may be further configured to receive the completion signal CL from the synchronizer 406. The controller 408 may receive the completion signal CL from the synchronizer 406 to indicate that the second delay value SD may be determined by the synchronizer 406. The controller 408 may be further configured to generate the ready signal RS. The ready signal RS may indicate a request to initiate analysis of the plurality of first audio blocks FB1-FBN and the plurality of second audio blocks SB1-SBN. The controller 408 may be further configured to provide the ready signal RS to the host processor 124. The controller 408 may be further configured to receive the confirmation signal CS from the host processor 124. The confirmation signal CS may indicate the initiation of analysis of the plurality of first audio quality scores FA1-FAN and the plurality of second audio quality scores SA1-SAN. The controller 408 may be further configured to receive the plurality of first power levels FV1-FVN and the plurality of second power levels SV1-SVN from the first receiver 116 and the second receiver 118, respectively.

The controller 408 may be further configured to determine whether the plurality of first power levels FV1-FVN and the plurality of second power levels SV1-SVN are greater than the threshold power level prior to analysis of the plurality of first audio quality scores FA1-FAN and the plurality of second audio quality scores SA1-SAN. For the sake of simplicity of explaining the ongoing description, it is assumed that the power levels of the first audio signal FS and the second audio signal SS may be greater than or equal to the threshold power level. The controller 408 may be further configured to determine whether to blend the plurality of first audio blocks FB1-FBN and the plurality of second audio blocks SB1-SBN based on analysis of the plurality of first audio quality scores FA1-FAN and the plurality of second audio quality scores SA1-SAN as explained in FIG. 2. The controller 408 may be further configured to generate an initiation signal IS based on the determination that the blending of the plurality of first audio blocks FB1-FBN and the plurality of second audio blocks SB1-SBN is essential. The initiation signal IS may indicate the initiation of at least one of the blending of the plurality of first audio blocks FB1-FBN and the plurality of second audio blocks SB1-SBN and outputting of an audio block from one of the plurality of first audio blocks FB1-FBN and the plurality of second audio blocks SB1-SBN. The controller 408 may be further configured to provide the initiation signal IS to the blender 410.

Blender 410:

The blender 410 may be configured to receive the plurality of first audio blocks FB1-FBN, the plurality of second audio blocks SB1-SBN, and the second delay value SD from the synchronizer 406. The blender 410 may be configured to receive the initiation signal IS from the controller 408. In one scenario, the blender 410 may output one of the plurality of first audio blocks FB1-FBN and the plurality of second audio blocks SB1-SBN as one of the plurality of blended blocks B1-BN (as explained in FIG. 2) based on the initiation signal IS. In another scenario, the blender 410 may blend the plurality of first audio blocks FB1-FBN and the plurality of second audio blocks SB1-SBN to output one of the plurality of blended blocks B1-BN (as explained in FIG. 2) based on the initiation signal IS. In another embodiment, the blender 410 may blend and output the plurality of blended audio blocks B1-BN based on the reception of a tuned plurality of first audio blocks FB1-FBN and the plurality of second audio blocks SB1-SBN from the synchronizer 406.

Figure 5A:
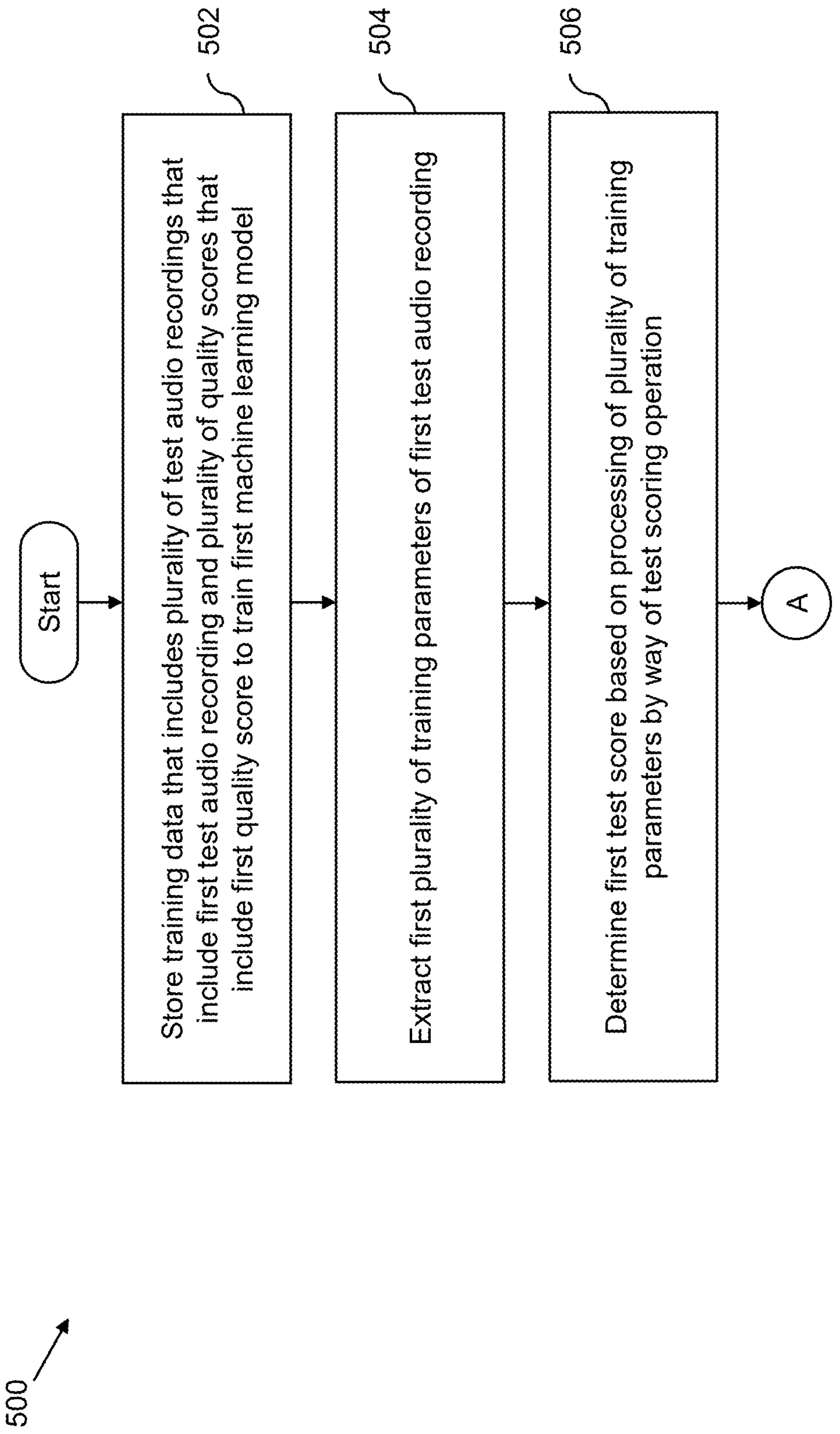
FIGS. 5A-5B, collectively, represent a flowchart that illustrates training of the first machine learning model of FIG. 3A in accordance with an embodiment of the present disclosure.
Figure 5B:
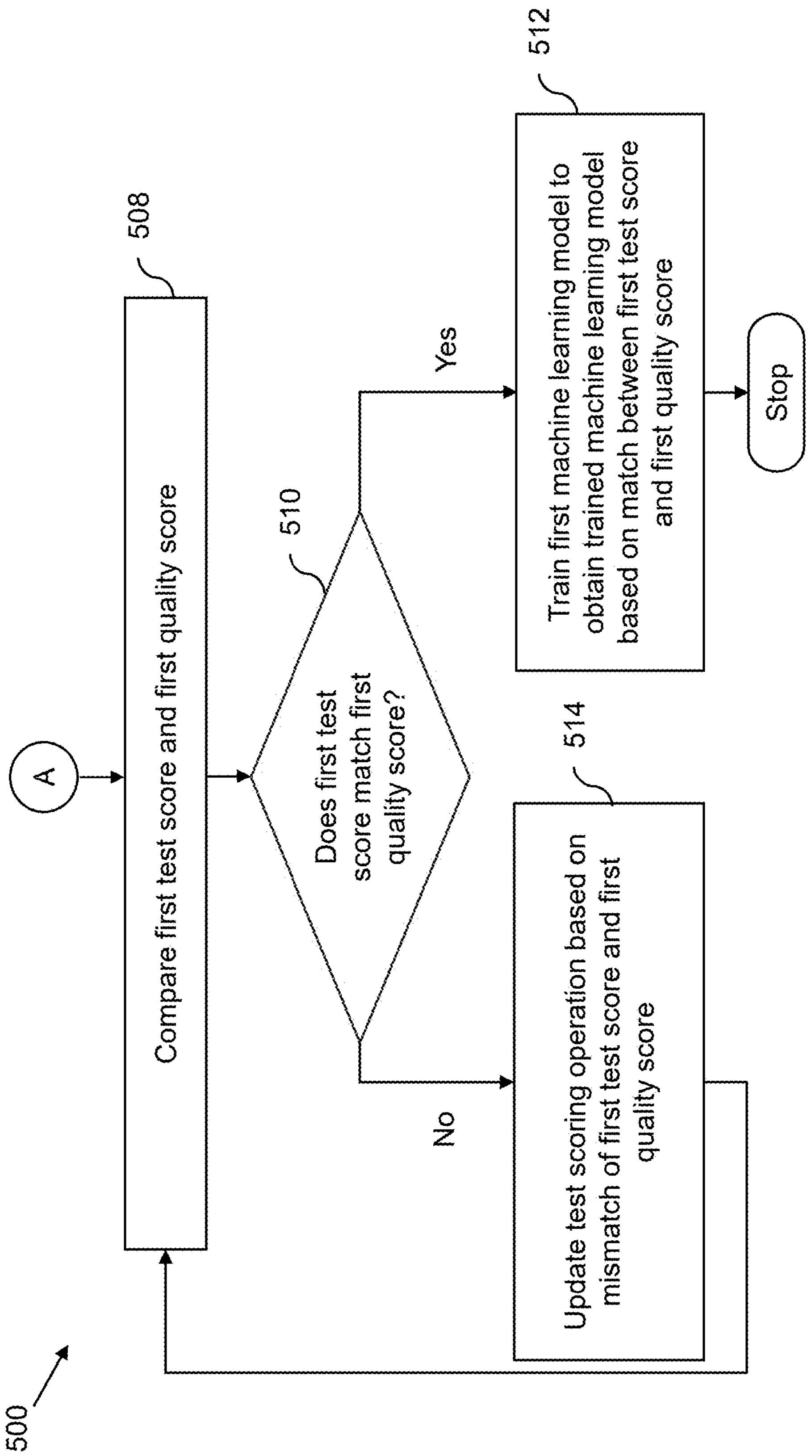

FIGS. 5A-5B, collectively, represents a flowchart 500 that illustrates training of a first machine learning model 302 in accordance with an embodiment of the present disclosure.

Referring to FIG. 5A, at step 502, the DSP circuit 126 may store the training data that may include the plurality of test audio recordings 304 and the plurality of quality scores 306 to train the first machine learning model 302. The plurality of test audio recordings 304 may include the first test audio recording, and the plurality of quality scores 306 may include the first quality score to train the first machine learning model 302. At step 504, the DSP circuit 126 may extract the first plurality of training parameters of the first test audio recording by executing the first machine learning model 302. At step 506, the DSP circuit 126 may determine the first test score based on the processing of the plurality of training parameters by way of the test scoring operation.

Referring to FIG. 5B, at step 508, the DSP circuit 126 may compare the first test score and the first quality score. At step 510, the DSP circuit 126 may determine whether the first test score matches the first quality score. If it is determined that the first test score matches the first quality score, step 512 is executed. At step 512, the DSP circuit 126 may train the first machine learning model 302 to obtain the trained machine learning model 310 based on the match between the first test score and the first quality score. If it is determined that the first test score does not match the first quality score, step 514 is executed. At step 514, the DSP circuit 126 may update the first machine learning model 302 based on the mismatch between the first test score and the first quality score and step 508 is executed. Steps 508, 510, and 514 are executed until the match may be determined between the first test score and the first quality score. Upon determining the match, step 512 is executed.

FIGS. 6A-6F, collectively, represents a flowchart 600 that illustrates an audio blending method by the DSP circuit 126 in accordance with an embodiment of the present disclosure.

Figure 6A:
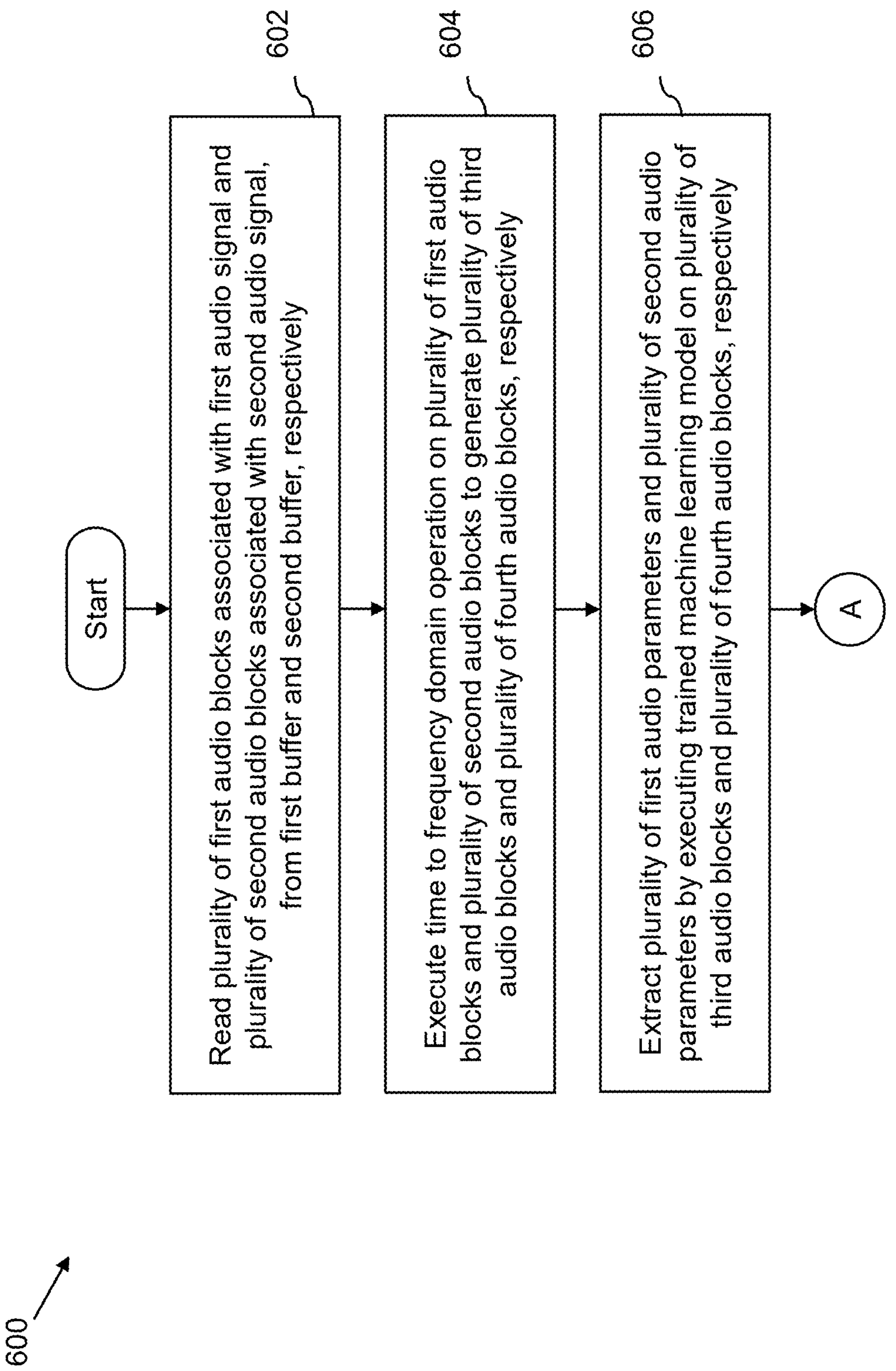
FIGS. 6A-6F, collectively, represents a flowchart that illustrates an audio blending method by the DSP circuit of FIG. 4 in accordance with an embodiment of the present disclosure.

Referring to FIG. 6A, at step 602, the DSP circuit 126 may read the plurality of first audio blocks FB1-FBN associated with the first audio signal FS and the plurality of second audio blocks SB1-SBN associated with the second audio signal SS from the first buffer 120 and the second buffer 122, respectively. At step 604, the DSP circuit 126 may execute the time to frequency domain operation on the plurality of first audio blocks FB1-FBN and the plurality of second audio blocks SB1-SBN to generate the plurality of third audio blocks and the plurality of fourth audio blocks, respectively. At step 606, the DSP circuit 126 may extract the plurality of first audio parameters and the plurality of second audio parameters by executing the trained machine learning model 310 on the plurality of third audio blocks and the plurality of fourth audio blocks, respectively.

Figure 6B:
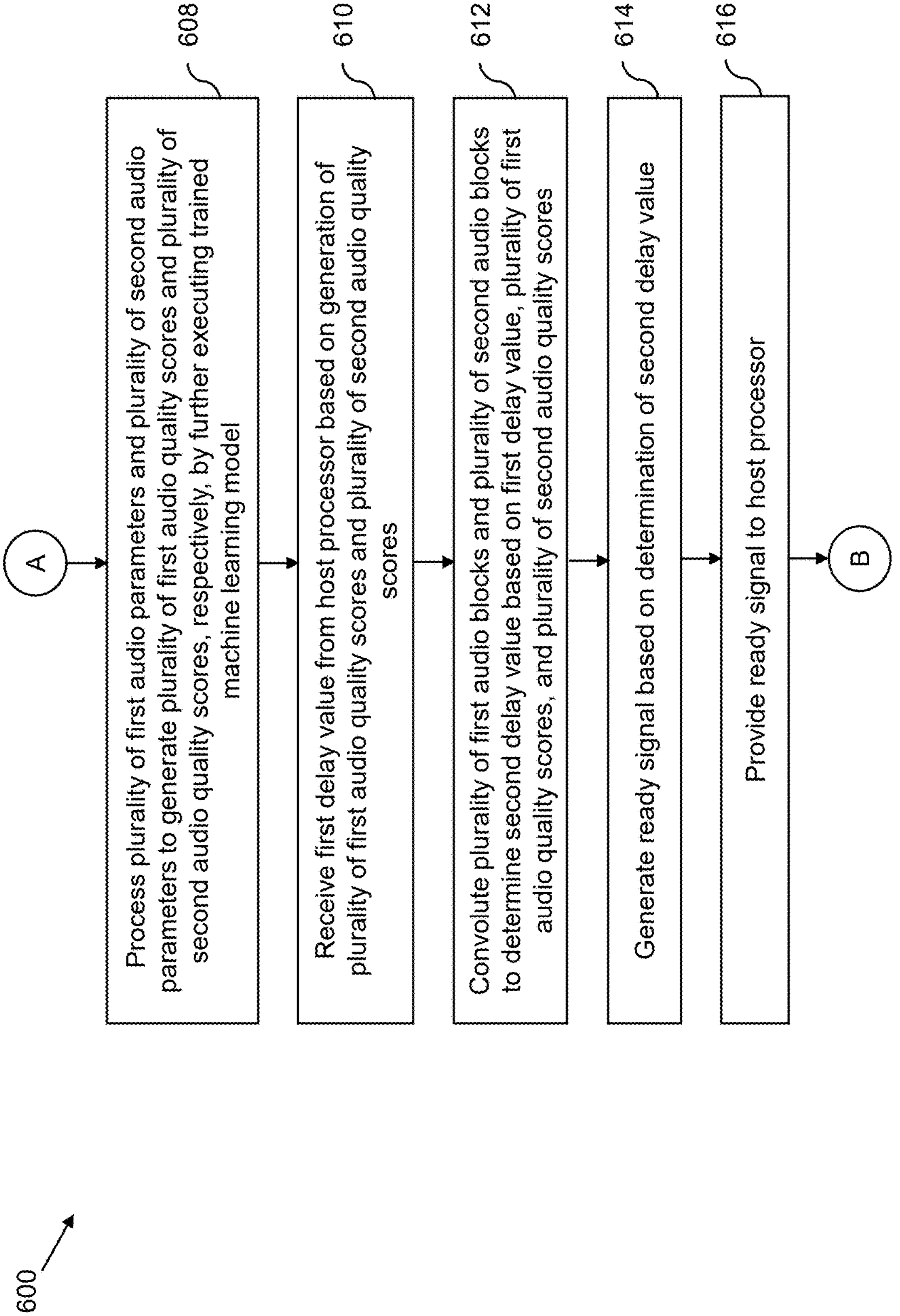

Referring to FIG. 6B, at step 608, the DSP circuit 126 may process the plurality of first audio parameters and the plurality of second audio parameters to generate the plurality of first audio quality scores FA1-FAN and the plurality of second audio quality scores SA1-SAN, respectively, by further executing the trained machine learning model 310. At step 610, the DSP circuit 126 may receive the first delay value FD from the host processor 124 based on the generation of the plurality of first audio quality scores FA1-FAN and the plurality of second audio quality scores SA1-SAN. At step 612, the DSP circuit 126 may convolute the plurality of first audio blocks FB1-FBN and the plurality of second audio blocks SB1-SBN to determine the second delay value SD based on the first delay value FD, the plurality of first audio quality scores FA1-FAN, and the plurality of second audio quality scores SA1-SAN. At step 614, the DSP circuit 126 may be configured to generate the ready signal RS based on the determination of the second delay value SD. At step 616, the DSP circuit 126 may provide the ready signal RS to the host processor 124.

Figure 6C:
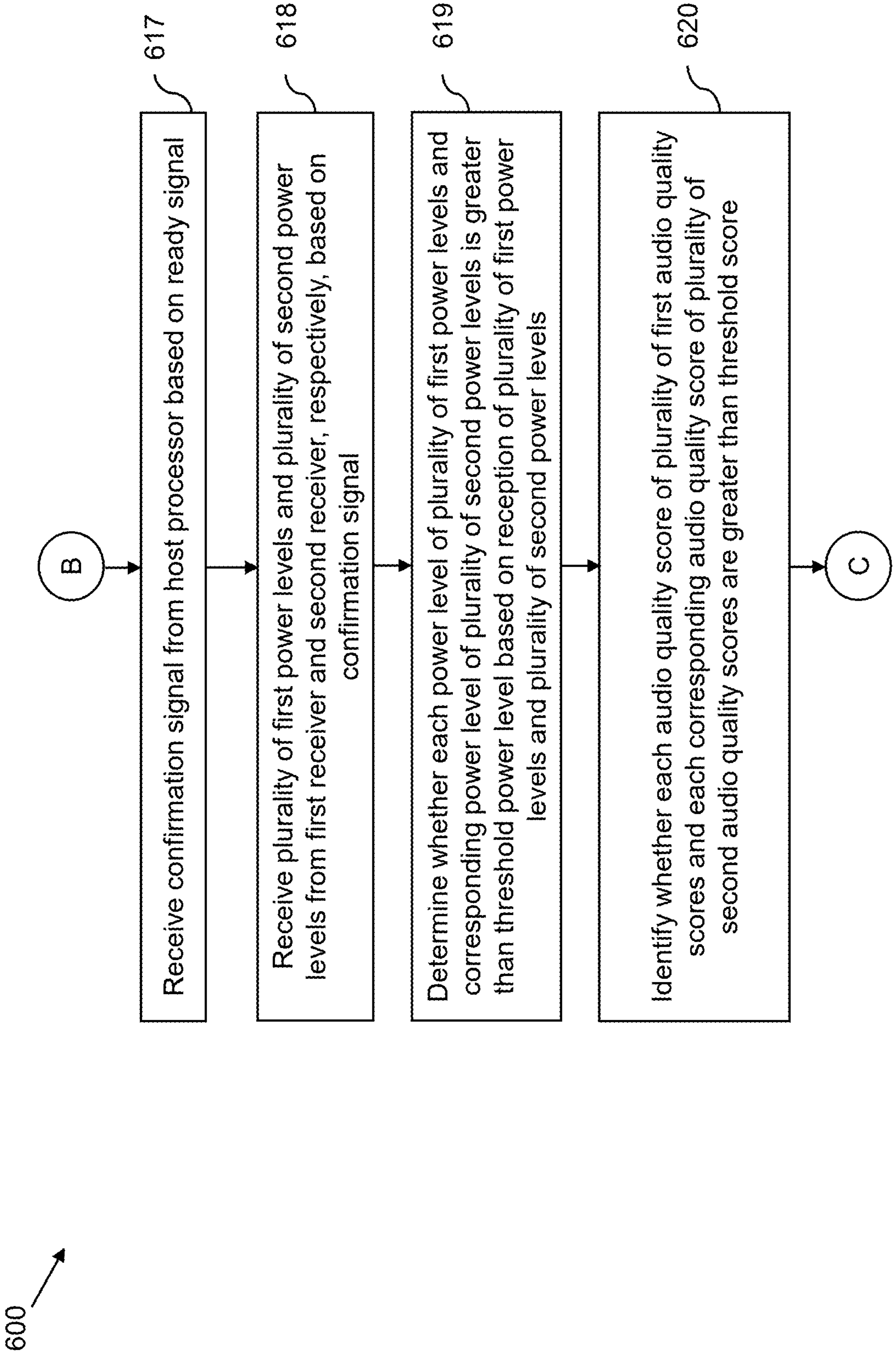

Referring now to FIG. 6C, at step 617, the DSP circuit 126 may receive the confirmation signal CS from the host processor 124 based on the ready signal RS. At step 618, the DSP circuit 126 may receive the plurality of first power levels FV1-FVN and the plurality of second power levels SV1-SVN from the first receiver 116 and the second receiver 118, respectively, based on the confirmation signal CS. At step 619, the DSP circuit 126 may determine whether each power level of the plurality of first power levels FV1-FVN and the corresponding power level of the plurality of second power levels SV1-SVN is greater than the threshold power level based on the reception of the plurality of first power levels FV1-FVN and the plurality of second power levels SV1-SVN. For the sake of simplicity of explaining the ongoing description, it is assumed that the power level of the first audio signal FS and the second audio signal SS may be greater than or equal to the threshold power level. At step 620, the DSP circuit 126 may identify whether each audio quality score of the plurality of first audio quality scores FA1-FAN and each corresponding audio quality score of the plurality of second audio quality scores SA1-SAN are greater than the threshold score.

Figure 6D:
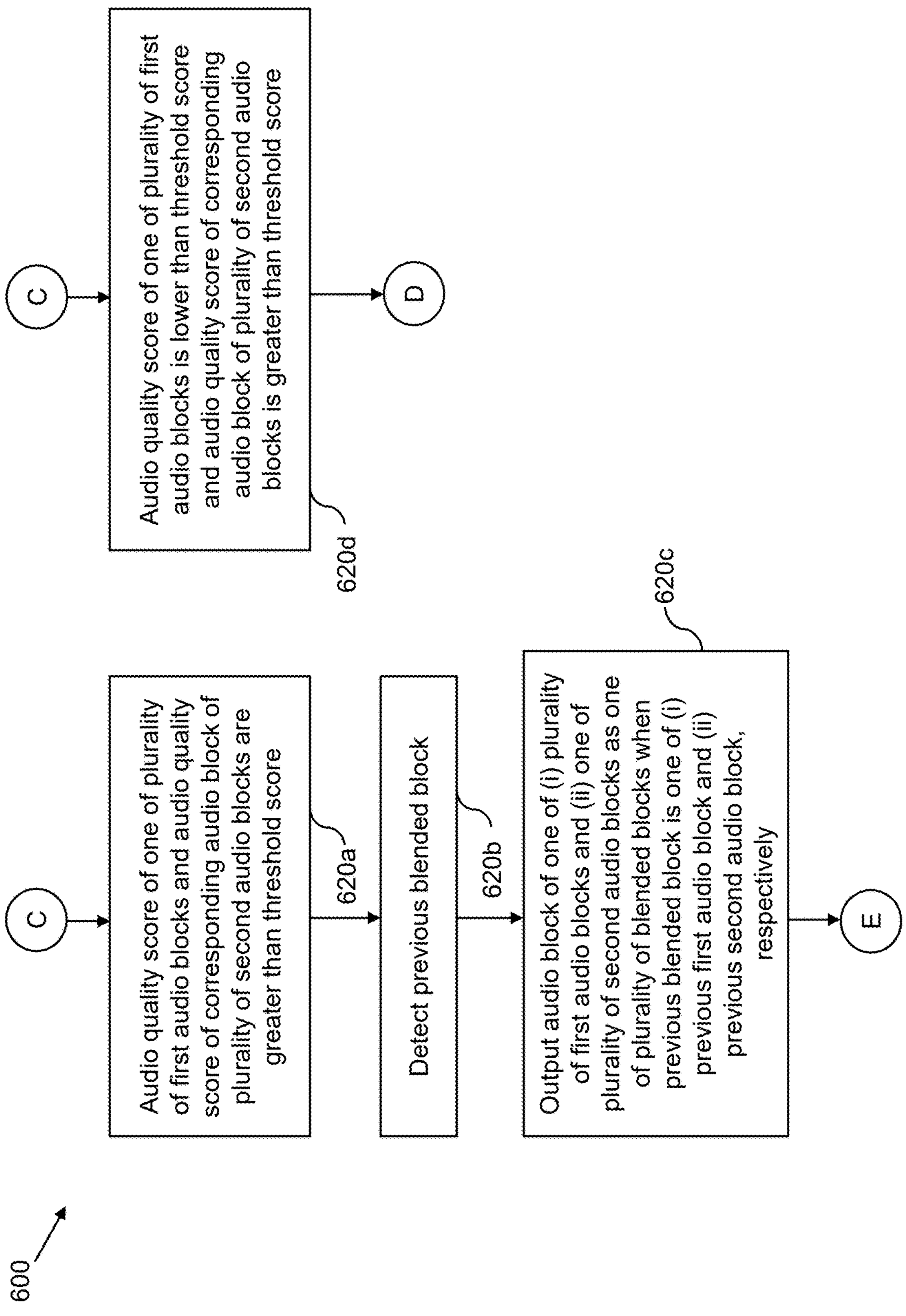

Referring now to FIG. 6D, steps 620*a*-620*c*, and steps 620*d*-620*i* are various exemplary scenarios, that illustrate steps to output an audio block. At step 620*a*, the DSP circuit 126 may identify that the audio quality score of one of the plurality of first audio blocks FB1-FBN and the audio quality score of a corresponding audio block of plurality of second audio blocks SB1-SBN are greater than the threshold score. At step 620*b*, the DSP circuit 126 may detect the previous blended block. At step 620*c*, the DSP circuit 126 may output the audio block of one of (i) the plurality of first audio blocks FB1-FBN and (ii) one of the plurality of second audio blocks SB1-SBN as one of the plurality of blended blocks B1-BN when the previous blended block is one of (i) a previous first audio block of the plurality of first audio blocks FB1-FBN and (ii) a previous second audio block of the plurality of second audio blocks SB1-SBN, respectively. Step 622 is executed after step 620*c*. In another exemplary scenario, at step 620*d*, the DSP circuit 126 may identify that the audio quality score of one of the plurality of first audio blocks FB1-FBN is lower than the threshold score and the audio quality score of the corresponding audio block of the plurality of second audio blocks SB1-SBN is greater than the threshold score.

Figure 6E:
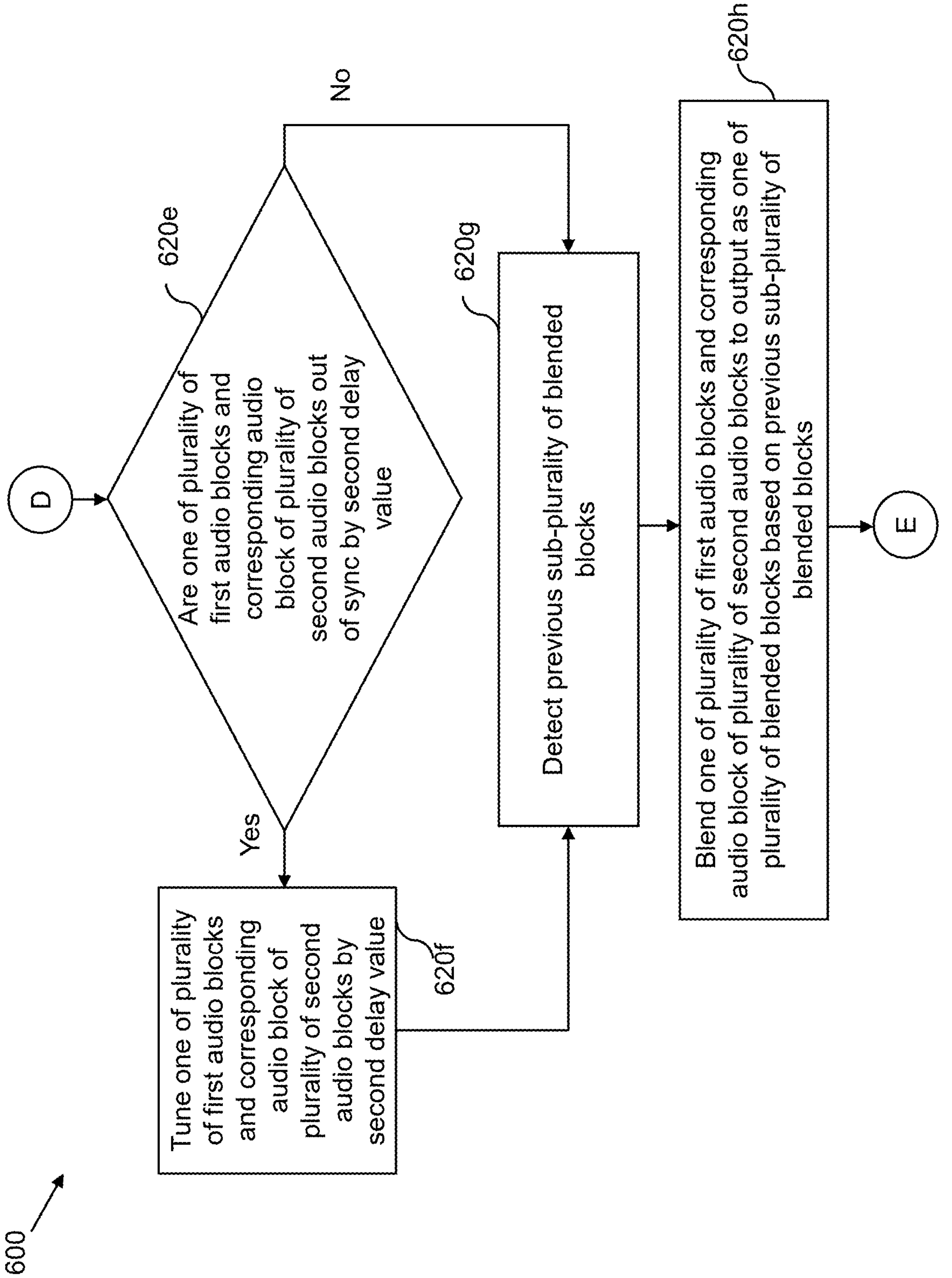

Referring now to FIG. 6E, at step 620*e*, the DSP circuit 126 may determine whether one of the plurality of first audio blocks FB1-FBN and the corresponding audio block of the plurality of second audio blocks SB1-SBN is out of sync by the second delay value SD. If it is determined that one of the plurality of first audio blocks FB1-FBN and the corresponding audio block of the plurality of second audio blocks SB1-SBN is out of sync by the second delay value SD, step 620*f* is executed. At step 620*f*, the DSP circuit 126 may tune one audio block from one of the plurality of first audio blocks FB1-FBN and a corresponding audio block of the plurality of second audio blocks SB1-SBN by the second delay value SD. Step 620*g* is executed after step 620*f*. If it is determined that one audio block from one of the plurality of first audio blocks FB1-FBN and the corresponding audio block of the plurality of second audio blocks SB1-SBN may be in sync, step 620*g* is executed. At step 620*g*, the DSP circuit 126 may detect the previous sub-plurality of blended blocks. At step 620*h*, the DSP circuit 126 may blend one of the plurality of first audio blocks FB1-FBN and the corresponding audio block of the plurality of second audio blocks SB1-SBN to output one of the plurality of blended blocks B1-BN based on the previous sub-plurality of blended blocks. Step 622 is executed after step 620*h*.

Figure 6F:
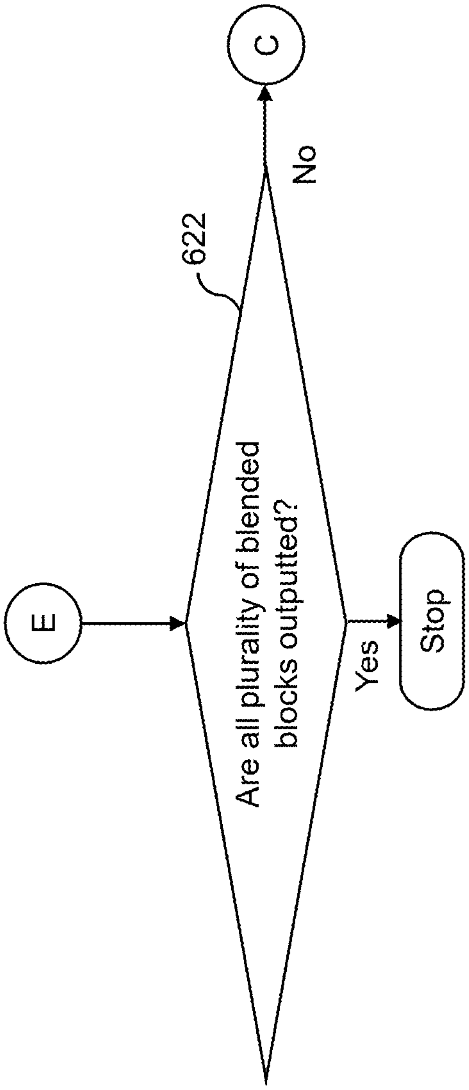

Referring now to FIG. 6F, at step 622, it is determined whether all the plurality of blended blocks B1-BN are outputted. If it is determined that all the plurality of blended blocks B1-BN are remaining to be outputted, one of steps 620*a* and 620*d* are executed. If it is determined that all the plurality of blended blocks B1-BN are outputted, the process comes to a halt.

In contrast to conventional solutions that rely solely on power levels of the audio signals, the DSP circuit 126 of the present disclosure outputs the plurality of blended blocks B1-BN based on an audio quality of each of the audio blocks by way of the plurality of first audio quality scores FA1-FAN and the plurality of second audio quality scores SA1-SAN along with the power levels of the audio signals. Thus, a quality of the output audio signal, e.g., the plurality of blended blocks B1-BN, is improved as compared to conventional solutions that output an audio signal solely based on the power levels. Due to the analysis of the plurality of first audio quality scores FA1-FAN and the plurality of second audio quality scores SA1-SAN, the trained machine learning model 310 may enable the DSP circuit 126 to predict the blending early, thereby resulting in a seamless cross-fade of blending the first audio signal FS and the second audio signal SS. Thus, a listening experience of the user is improved. Additionally, the DSP circuit 126 may ignore the plurality of rejected audio blocks during the determination of the second delay value SD to ensure that the second delay value SD is determined accurately. The DSP circuit 126 may execute the blending of the first audio signal FS and the second audio signal SS based on the previous sub-plurality of blended blocks and the number of the sub-plurality of audio blocks. Thus, processing cycles for outputting each blended block of the plurality of blended blocks B1-BN are reduced, and the plurality of blended blocks B1-BN are outputted at a faster rate than conventional solutions.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as “first” and “second” are used to arbitrarily distinguish between the elements such terms describe. Thus, these terms are not necessarily intended to indicate temporal or other prioritization of such elements.

In an embodiment of the present disclosure, a system for blending audio signals is disclosed. The system may comprise a digital signal processing (DSP) circuit. The DSP circuit may be configured to extract, by executing a trained machine learning model, a plurality of first audio parameters associated with the plurality of first audio blocks of a first audio signal and a plurality of second audio parameters associated with the plurality of second audio blocks of a second audio signal. The system may be configured to receive the first audio signal and the second audio signal. The DSP circuit may be further configured to process, by further executing the trained machine learning model, the plurality of first audio parameters and the plurality of second audio parameters to generate a plurality of first audio quality scores and a plurality of second audio quality scores, respectively, wherein each audio quality score of the plurality of first audio quality scores and the plurality of second audio quality scores may be indicative of an audio quality of a corresponding audio block of the plurality of first audio blocks and the plurality of second audio blocks, respectively. The DSP circuit may be further configured to analyze the plurality of first audio quality scores and the plurality of second audio quality scores. The DSP circuit may be further configured to output, upon analyzing the plurality of first audio quality scores and the plurality of second audio quality scores, a plurality of blended blocks, wherein each of the plurality of blended blocks may be at least one of a first audio block of the plurality of first audio blocks and a second audio block of the plurality of second audio blocks.

In some embodiments, the DSP circuit may be further configured to train a first machine learning model based on training data to obtain the trained machine learning model, wherein the training data may comprise a plurality of test audio recordings and a plurality of quality scores such that the plurality of quality scores may include a first quality score of a first test audio recording of the plurality of test audio recordings, wherein each of the plurality of quality scores may indicate an audio quality of a corresponding test audio recording, and wherein a low score may indicate a low quality of a test audio recording of the plurality of test audio recordings and a high score may indicate a high quality of the test audio recording.

In some embodiments, to train the first machine learning model, the DSP circuit may be further configured to extract a first plurality of training parameters of the first test audio recording. The DSP circuit may be further configured to determine, by way of a test scoring operation, a first test score based on processing of the first plurality of training parameters. The DSP circuit may be further configured to compare the first test score with the first quality score to determine a match between the first test score and the first quality score, wherein the match between the first test score and the first quality score may indicate to the first machine learning model that the determination of the first test score by way of the test scoring operation may be accurate, and a mismatch between the first test score and the first quality score may indicate to the first machine learning model that the determination of the first test score by way of the test scoring operation may be erroneous. The DSP circuit may be further configured to update the test scoring operation until the match may be determined between the first test score and the first quality score, wherein the first machine learning model may be trained based on the match between the first test score and the first quality score, and wherein the trained machine learning model may generate the plurality of first audio quality scores and the plurality of second audio quality scores based on the training of the first machine learning model.

In some embodiments, the DSP circuit may be further configured to execute a time to frequency domain operation, on the plurality of first audio blocks and the plurality of second audio blocks to generate a plurality of third audio blocks and a plurality of fourth audio blocks, respectively, wherein the plurality of third audio blocks and the plurality of fourth audio blocks in the frequency domain may be provided to the trained machine learning model to extract the plurality of first audio parameters and the plurality of second audio parameters, respectively.

In some embodiments, the system may further comprise a first receiver and a second receiver that may be configured to receive the first audio signal and the second audio signal from an audio source. The first and second receivers may be further configured to convert, each of the first audio signal and the second audio signal to a digitized version of each of the first audio signal and the second audio signal, respectively.

In some embodiments, the system may further comprise a first buffer and a second buffer coupled to the first receiver and the second receiver, respectively, wherein the first buffer and the second buffer are configured to receive a digitized version of each of the first audio signal and the second audio signal, from the first receiver and the second receiver, respectively. The first buffer and the second buffer may be further configured to store the digitized version of each of the first audio signal and the second audio signal, respectively.

In some embodiments, wherein the DSP circuit may be further configured to read the plurality of first audio blocks and the plurality of second audio blocks from the first buffer and the second buffer, respectively, wherein the plurality of first audio parameters and the plurality of second audio parameters may be extracted upon reading the plurality of first audio blocks and the plurality of second audio blocks, respectively.

In some embodiments, the system may further comprise a host processor, wherein the DSP circuit may be further configured to receive, from the host processor, a first delay value that may indicate an expected delay between the plurality of first audio blocks and the plurality of second audio blocks prior to analyzing the plurality of first audio quality scores and the plurality of second audio quality scores. The DSP circuit may be further configured to convolute the plurality of first audio blocks and the plurality of second audio blocks based on a group consisting of the first delay value, the plurality of first audio quality scores, and the plurality of second audio quality scores to determine a second delay value that may indicate the actual delay between the plurality of first audio blocks and the plurality of second audio blocks.

In some embodiments, the DSP circuit may be further configured to generate a ready signal based on the second delay value. The DSP circuit may be further configured to provide the ready signal to the host processor, wherein the ready signal may indicate a request to initiate analysis of the plurality of first audio blocks and the plurality of second audio blocks. The DSP circuit may be further configured to receive, from the host processor, a confirmation signal based on the ready signal, wherein the confirmation signal may indicate initiation of analysis of the plurality of first audio blocks and the plurality of second audio blocks.

In some embodiments, the DSP circuit may be further configured to tune, one of a first audio block of the plurality of first audio blocks and a corresponding second audio block of the plurality of second audio blocks based on detection that one of the first audio block and the corresponding second audio block may be out of sync by the second delay value. The DSP circuit may be further configured to blend the first audio block with the corresponding second audio block to output a blended block of the plurality of blended blocks, wherein a first audio block may be blended with the corresponding second audio block upon the tuning of one of the first audio block and the corresponding second audio block.

In some embodiments, to analyze the plurality of first audio quality scores and the plurality of second audio quality scores, the DSP circuit may be further configured to identify whether each audio quality score of the plurality of first audio quality scores and each corresponding audio quality score of the plurality of second audio quality scores may be greater than a threshold score, wherein (i) the plurality of first audio blocks may include a first audio block and a second audio block such that the second audio block may be subsequent to the first audio block, (ii) the plurality of second audio blocks may include a third audio block such that the third audio block may correspond to the second audio block, (iii) the plurality of first audio quality scores may include a first audio quality score of the first audio block and a second audio quality score of the second audio block, and (iv) the plurality of second audio quality scores may include a third audio quality score of the third audio block, wherein upon identifying that at least one audio quality score of the plurality of first audio quality scores and the plurality of second audio quality scores may be greater than the threshold score, the DSP circuit may be further configured to detect, at least one previous blended block of the plurality of blended blocks to output one of the plurality of blended blocks.

In some embodiments, wherein upon identifying that (i) the second audio quality score and the third audio quality score may be greater than the threshold score and (ii) the third audio quality score may be greater than the second audio quality score, the DSP circuit may detect a previous blended block of the plurality of blended blocks, and wherein upon detecting that the first audio block may be the previous blended block, the second audio block may be outputted as a current blended block of the plurality of blended blocks.

In some embodiments, upon identifying that (i) the first audio quality score and the second audio quality score may be lower than the threshold score and the third audio quality score may be greater than the threshold score, the DSP circuit may detect a previous sub-plurality of blended blocks of the plurality of blended blocks, wherein when the previous sub-plurality of blended blocks may be detected to be a sub-plurality of audio blocks of the plurality of first audio blocks such that the sub-plurality of audio blocks (i) may include the first audio block and (ii) may have audio quality scores that are identified to be lower than the threshold score, the DSP circuit may blend the second audio block and the third audio block to output a current blended block of the plurality of blended blocks.

In some embodiments, each of the plurality of first audio parameters and the plurality of second audio parameters may include a group consisting of a spectral centroid, a spectral flux, and a noise floor of each of the plurality of first audio blocks and the plurality of second audio blocks, respectively.

In some embodiments, data associated with the first audio signal and data associated with the second audio signal may be identical in nature.

In another embodiment of the present disclosure, a method is disclosed. The method may comprise extracting, by a digital signal processing (DSP) circuit by executing a trained machine learning model, a plurality of first audio parameters associated with a plurality of first audio blocks of a first audio signal and a plurality of second audio parameters associated with a plurality of second audio blocks of a second audio signal. The method may further comprise processing, by the DSP circuit by further executing the trained machine learning model, the plurality of first audio parameters, and the plurality of second audio parameters to generate a plurality of first audio quality scores and a plurality of second audio quality scores, respectively, wherein each audio quality score of the plurality of first audio quality scores and the plurality of second audio quality scores may be indicative of an audio quality of a corresponding audio block of the plurality of first audio blocks and the plurality of second audio blocks, respectively. The method may further comprise analyzing, by the DSP circuit, the plurality of first audio quality scores and the plurality of second audio quality scores. The method may further comprise outputting, by the DSP circuit upon analyzing the plurality of first audio quality scores and the plurality of second audio quality scores, a plurality of blended blocks, wherein each of the plurality of blended blocks may be at least one of a first audio block of the plurality of first audio blocks and a second audio block of the plurality of second audio blocks.

In some embodiments, the method may further comprise training, by the DSP circuit, a first machine learning model based on training data to obtain the trained machine learning model, wherein the training data may comprise a plurality of test audio recordings and a plurality of quality scores such that the plurality of quality scores may include a first quality score of a first test audio recording of the plurality of test audio recordings, wherein each of the plurality of quality scores may be indicative of an audio quality of a corresponding test audio recording, and wherein a low score may indicate a low quality of a test audio recording of the plurality of test audio recordings and a high score may indicate a high quality of the test audio recording.

In some embodiments, the method may further comprise identifying, by the DSP circuit whether each audio quality score of the plurality of first audio quality scores and each corresponding audio quality score of the plurality of second audio quality scores is greater than a threshold score, wherein (i) the plurality of first audio blocks may include a first audio block and a second audio block such that the second audio block may be subsequent to the first audio block, (ii) the plurality of second audio blocks may include a third audio block such that the third audio block may correspond to the second audio block, (iii) the plurality of first audio quality scores may include a first audio quality score of the first audio block and a second audio quality score of the second audio block, and (iv) the plurality of second audio quality scores may include a third audio quality score of the third audio block. The method may further comprise detecting, by the DSP circuit at least one previous blended block of the plurality of blended blocks to output one of the plurality of blended blocks upon identifying that at least one audio quality score of the plurality of first audio quality scores and the plurality of second audio quality scores may be greater than the threshold score thereby analyzing the plurality of first audio quality scores and the plurality of second audio quality scores.

In some embodiments, upon identifying that (i) the second audio quality score and the third audio quality score may be greater than the threshold score and (ii) the third audio quality score may be greater than the second audio quality score, a previous blended block of the plurality of blended blocks may be detected by the DSP circuit, and wherein upon detecting that the first audio block may be the previous blended block, the second audio block may be outputted as a current blended block of the plurality of blended blocks.

In some embodiments, the method may further comprise blending, by the DSP circuit the second audio block and the third audio block to output a current blended block of the plurality of blended blocks, wherein the second audio block and the third audio block are may be blended upon identifying that (i) the first audio quality score and the second audio quality score may be lower than the threshold score and the third audio quality score may be greater than the threshold score, and when a previous sub-plurality of blended blocks of the plurality of blended blocks are detected to be a sub-plurality of audio blocks of the plurality of first audio blocks such that the sub-plurality of audio blocks (i) include the first audio block and (ii) have audio quality scores may be identified to be lower than the threshold score.

What is claimed is:

1. A system for blending audio signals, the system comprising:

a host processor;

a digital signal processing (DSP) circuit configured to:

extract, by executing a trained machine learning model, a plurality of first audio parameters associated with a plurality of first audio blocks of a first audio signal and a plurality of second audio parameters associated with a plurality of second audio blocks of a second audio signal, wherein the system is configured to receive the first audio signal and the second audio signal;

process, by further executing the trained machine learning model, the plurality of first audio parameters and the plurality of second audio parameters to generate a plurality of first audio quality scores and a plurality of second audio quality scores, respectively, wherein each audio quality score of the plurality of first audio quality scores and the plurality of second audio quality scores is indicative of an audio quality of a corresponding audio block of the plurality of first audio blocks and the plurality of second audio blocks, respectively;

analyze the plurality of first audio quality scores and the plurality of second audio quality scores;

receive, from the host processor, a first delay value that indicates an expected delay between the plurality of first audio blocks and the plurality of second audio blocks prior to analyzing the plurality of first audio quality scores and the plurality of second audio quality scores; and convolute the plurality of first audio blocks and the plurality of second audio blocks based on a group consisting of the first delay value, the plurality of first audio quality scores, and the plurality of second audio quality scores to determine a second delay value that indicates an actual delay between the plurality of first audio blocks and the plurality of second audio blocks; and output, upon analyzing the plurality of first audio quality scores and the plurality of second audio quality scores and using the second delay value, a plurality of blended blocks, wherein each of the plurality of blended blocks is at least one of a first audio block of the plurality of first audio blocks and a second audio block of the plurality of second audio blocks.

2. The system of claim 1, wherein the DSP circuit is further configured to train a first machine learning model based on training data to obtain the trained machine learning model, wherein the training data comprises a plurality of test audio recordings and a plurality of quality scores such that the plurality of quality scores include a first quality score of a first test audio recording of the plurality of test audio recordings, wherein each of the plurality of quality scores is indicative of an audio quality of a corresponding test audio recording, and wherein a low score indicates a low quality of a test audio recording of the plurality of test audio recordings and a high score indicates a high quality of the test audio recording.

3. The system of claim 2, wherein to train the first machine learning model, the DSP circuit is further configured to:

extract a first plurality of training parameters of the first test audio recording;

determine, by way of a test scoring operation, a first test score based on processing of the first plurality of training parameters;

compare the first test score with the first quality score to determine a match between the first test score and the first quality score, wherein the match between the first test score and the first quality score indicates to the first machine learning model that the determination of the first test score by way of the test scoring operation is accurate, and a mismatch between the first test score and the first quality score indicates to the first machine learning model that the determination of the first test score by way of the test scoring operation is erroneous; and update the test scoring operation until the match is determined between the first test score and the first quality score, wherein the first machine learning model is trained based on the match between the first test score and the first quality score, and wherein the trained machine learning model generates the plurality of first audio quality scores and the plurality of second audio quality scores based on the training of the first machine learning model.

4. The system of claim 1, wherein the DSP circuit is further configured to execute a time to frequency domain operation, on the plurality of first audio blocks and the plurality of second audio blocks to generate a plurality of third audio blocks and a plurality of fourth audio blocks, respectively, and wherein the plurality of third audio blocks and the plurality of fourth audio blocks in the frequency domain are provided to the trained machine learning model to extract the plurality of first audio parameters and the plurality of second audio parameters, respectively.

5. The system of claim 1, further comprising a first receiver and a second receiver that are configured to:

receive the first audio signal and the second audio signal from an audio source; and convert, each of the first audio signal and the second audio signal to a digitized version of each of the first audio signal and the second audio signal, respectively.

6. The system of claim 5, further comprising a first buffer and a second buffer coupled to the first receiver and the second receiver, respectively, wherein the first buffer and the second buffer are configured to:

receive the digitized version of each of the first audio signal and the second audio signal, from the first receiver and the second receiver, respectively; and store the digitized version of each of the first audio signal and the second audio signal, as the plurality of first audio blocks and the plurality of second audio blocks, respectively.

7. The system of claim 6, wherein the DSP circuit is further configured to read the plurality of first audio blocks and the plurality of second audio blocks from the first buffer and the second buffer, respectively, wherein the plurality of first audio parameters and the plurality of second audio parameters are extracted upon reading the plurality of first audio blocks and the plurality of second audio blocks, respectively.

8. The system of claim 1, wherein the DSP circuit is further configured to: generate a ready signal based on the second delay value; provide the ready signal to the host processor, wherein the ready signal indicates a request to initiate analysis of the plurality of first audio blocks and the plurality of second audio blocks; and receive, from the host processor, a confirmation signal based on the ready signal, wherein the confirmation signal indicates initiation of analysis of the plurality of first audio blocks and the plurality of second audio blocks.

9. The system of claim 1, wherein the DSP circuit is further configured to: tune, one of a first audio block of the plurality of first audio blocks and a corresponding second audio block of the plurality of second audio blocks based on detection that one of the first audio block and the corresponding second audio block is out of sync by the second delay value; and blend the first audio block with the corresponding second audio block to output a blended block of the plurality of blended blocks, wherein a first audio block is blended with the corresponding second audio block upon the tuning of one of the first audio block and the corresponding second audio block.

10. The system of claim 1, wherein to analyze the plurality of first audio quality scores and the plurality of second audio quality scores, the DSP circuit is further configured to identify, whether each audio quality score of the plurality of first audio quality scores and each corresponding audio quality score of the plurality of second audio quality scores is greater than a threshold score, wherein (i) the plurality of first audio blocks include a first audio block and a second audio block such that the second audio block is subsequent to the first audio block, (ii) the plurality of second audio blocks include a third audio block such that the third audio block corresponds to the second audio block, (iii) the plurality of first audio quality scores include a first audio quality score of the first audio block and a second audio quality score of the second audio block, and (iv) the plurality of second audio quality scores include a third audio quality score of the third audio block, and wherein upon identifying that at least one audio quality score of the plurality of first audio quality scores and the plurality of second audio quality scores is greater than the threshold score, the DSP circuit is further configured to detect, at least one previous blended block of the plurality of blended blocks to output one of the plurality of blended blocks.

11. The system of claim 10, wherein upon identifying that (i) the second audio quality score and the third audio quality score are greater than the threshold score and (ii) the third audio quality score is greater than the second audio quality score, the DSP circuit detects a previous blended block of the plurality of blended blocks, and wherein upon detecting that the first audio block is the previous blended block, the second audio block is outputted as a current blended block of the plurality of blended blocks.

12. The system of claim 10, wherein upon identifying that (i) the first audio quality score and the second audio quality score are lower than the threshold score and the third audio quality score is greater than the threshold score, the DSP circuit detects a previous sub-plurality of blended blocks of the plurality of blended blocks, wherein when the previous sub-plurality of blended blocks are detected to be a sub-plurality of audio blocks of the plurality of first audio blocks such that the sub-plurality of audio blocks (i) include the first audio block and (ii) have audio quality scores that are identified to be lower than the threshold score, the DSP circuit blends the second audio block and the third audio block to output a current blended block of the plurality of blended blocks.

13. The system of claim 1, wherein each of the plurality of first audio parameters and the plurality of second audio parameters include a group consisting of a spectral centroid, a spectral flux, and a noise floor of each of the plurality of first audio blocks and the plurality of second audio blocks, respectively.

14. The system of claim 1, wherein data associated with the first audio signal and data associated with the second audio signal are identical in nature.

15. A method comprising:

extracting, by a digital signal processing (DSP) circuit by executing a trained machine learning model, a plurality of first audio parameters associated with a plurality of first audio blocks of a first audio signal and a plurality of second audio parameters associated with a plurality of second audio blocks of a second audio signal;

processing, by the DSP circuit by further executing the trained machine learning model, the plurality of first audio parameters and the plurality of second audio parameters to generate a plurality of first audio quality scores and a plurality of second audio quality scores, respectively, wherein each audio quality score of the plurality of first audio quality scores and the plurality of second audio quality scores is indicative of an audio quality of a corresponding audio block of the plurality of first audio blocks and the plurality of second audio blocks, respectively;

analyzing, by the DSP circuit, the plurality of first audio quality scores and the plurality of second audio quality scores;

the DSP circuit receiving from a host processor, a first delay value that indicates an expected delay between the plurality of first audio blocks and the plurality of second audio blocks prior to analyzing the plurality of first audio quality scores and the plurality of second audio quality scores; and convolute the plurality of first audio blocks and the plurality of second audio blocks based on a group consisting of the first delay value, the plurality of first audio quality scores, and the plurality of second audio quality scores to determine a second delay value that indicates an actual delay between the plurality of first audio blocks and the plurality of second audio blocks; and outputting, by the DSP circuit upon analyzing the plurality of first audio quality scores and the plurality of second audio quality scores, and the second delay value, a plurality of blended blocks, wherein each of the plurality of blended blocks is at least one of a first audio block of the plurality of first audio blocks and a second audio block of the plurality of second audio blocks.

16. The method of claim 15, further comprising training, by the DSP circuit, a first machine learning model based on training data to obtain the trained machine learning model, wherein the training data comprises a plurality of test audio recordings and a plurality of quality scores such that the plurality of quality scores include a first quality score of a first test audio recording of the plurality of test audio recordings, wherein each of the plurality of quality scores is indicative of an audio quality of a corresponding test audio recording, and wherein a low score indicates a low quality of a test audio recording of the plurality of test audio recordings and a high score indicates a high quality of the test audio recording.

17. The method of claim 15, further comprising:

identifying, by the DSP circuit whether each audio quality score of the plurality of first audio quality scores and each corresponding audio quality score of the plurality of second audio quality scores is greater than a threshold score, wherein (i) the plurality of first audio blocks include a first audio block and a second audio block such that the second audio block is subsequent to the first audio block, (ii) the plurality of second audio blocks include a third audio block such that the third audio block corresponds to the second audio block, (iii) the plurality of first audio quality scores include a first audio quality score of the first audio block and a second audio quality score of the second audio block, and (iv) the plurality of second audio quality scores include a third audio quality score of the third audio block; and detecting, by the DSP circuit at least one previous blended block of the plurality of blended blocks to output one of the plurality of blended blocks upon identifying that at least one audio quality score of the plurality of first audio quality scores and the plurality of second audio quality scores is greater than the threshold score thereby analyzing the plurality of first audio quality scores and the plurality of second audio quality scores.

18. The method of claim 17, wherein upon identifying that (i) the second audio quality score and the third audio quality score are greater than the threshold score and (ii) the third audio quality score is greater than the second audio quality score, a previous blended block of the plurality of blended blocks is detected by the DSP circuit and wherein upon detecting that the first audio block is the previous blended block, the second audio block is outputted as a current blended block of the plurality of blended blocks.

19. The method of claim 17, further comprising blending, by the DSP circuit, the second audio block and the third audio block to output a current blended block of the plurality of blended blocks, wherein the second audio block and the third audio block are blended upon identifying that (i) the first audio quality score and the second audio quality score are lower than the threshold score and the third audio quality score is greater than the threshold score, and when a previous sub-plurality of blended blocks of the plurality of blended blocks are detected to be a sub-plurality of audio blocks of the plurality of first audio blocks such that the sub-plurality of audio blocks (i) include the first audio block and (ii) have audio quality scores that are identified to be lower than the threshold score.

* * * * *